US008629919B2

(12) United States Patent  (10) Patent No.: US 8,629,919 B2
Imai  (45) Date of Patent: Jan. 14, 2014

(54) IMAGE CAPTURE WITH IDENTIFICATION OF ILLUMINANT

(75) Inventor: Francisco Imai, Mountain View, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 373 days.

(21) Appl. No.: 12/859,115

(22) Filed: Aug. 18, 2010

(65) Prior Publication Data

US 2012/0044380 A1  Feb. 23, 2012

(51) Int. Cl.
    H04N 9/73  (2006.01)
    H04N 9/68  (2006.01)
    G06K 9/00  (2006.01)

(52) U.S. Cl.
    USPC .................. 348/223.1; 348/234; 382/167

(58) Field of Classification Search
    USPC .............. 348/207.99, 224.1, 234, 364, 223.1;
                    382/167, 294; 257/466
    See application file for complete search history.

(56) References Cited

U.S. PATENT DOCUMENTS

| 5,965,875 | A | 10/1999 | Merrill | 250/226 |
|---|---|---|---|---|
| 6,466,961 | B1 | 10/2002 | Miller | 708/816 |
| 7,035,484 | B2 | 4/2006 | Silberberg et al. | 385/1 |
| 7,055,986 | B2 | 6/2006 | Littleton | 362/231 |
| 7,217,951 | B2 | 5/2007 | Krishna et al. | 257/21 |
| 7,554,586 | B1 | 6/2009 | Imai et al. | 348/269 |
| 7,599,550 | B1 | 10/2009 | Kaplinsky | |
| 2002/0012064 | A1* | 1/2002 | Yamaguchi | 348/362 |
| 2006/0050335 | A1 | 3/2006 | Dorrell et al. | |
| 2008/0252735 | A1 | 10/2008 | Silverbrook et al. | |
| 2008/0310710 | A1 | 12/2008 | Berestov et al. | |
| 2009/0160974 | A1 | 6/2009 | Oyama | 348/231.2 |
| 2009/0185039 | A1 | 7/2009 | Hatanaka | 348/207.1 |
| 2009/0225186 | A1* | 9/2009 | Kurokawa | 348/222.1 |
| 2009/0303247 | A1* | 12/2009 | Zhang et al. | 345/594 |
| 2010/0044822 | A1* | 2/2010 | Longoni et al. | 257/446 |
| 2010/0165144 | A1 | 7/2010 | Lee | |
| 2011/0293259 | A1* | 12/2011 | Doepke et al. | 396/236 |

OTHER PUBLICATIONS

K. Hirakawa, et al., "Spatio-spectral color filter array design for enhanced image fidelity", Proc. of ICIP, (2007).

A. Longoni, et al., "The transverse field detector (TFD): a novel color-sensitive CMOS device", IEEE Electron Device Letters, 29, pp. 1306-1308, (2008).

(Continued)

*Primary Examiner* — Lin Ye
*Assistant Examiner* — Mekonnen Dagnew
(74) *Attorney, Agent, or Firm* — Canon U.S.A., Inc. IP Division

(57) ABSTRACT

Image capture of a scene in which there is an identification of an imaging property of the scene, such as the illuminant or dynamic range of the scene. An imaging assembly has a spectral response which is tunable in accordance with a capture parameter, and first and second different capture parameters are applied to the image sensor. Respective first and second images of the scene are captured. The first and second images of the scene are compared to identify an imaging property of the scene, such as the illuminant or multiple illuminants in respective ones of multiple regions in the scene. In accordance with the property identified for the scene, a third capture parameter is derived, such as to obtain color correction or white balance in accordance with each identified illuminant. The third capture parameter is applied to the image sensor, and a final image of the scene is captured.

64 Claims, 17 Drawing Sheets

(56) References Cited

OTHER PUBLICATIONS

G. Langfelder, et al., "Tunable Spectral Responses in a Color-Sensitive CMOS pixel for imaging applications", IEEE Transactions on Electronic Devices, vol. 56, No. 11, (Nov. 2009).
F. Zaraga, et al., "White balance by tunable spectral responsivities", J. Opt. Soc. Am. A27, 31-39 (2010).
D.L. Gilblom, et al."Real-Time color imaging with a CMOS sensor having stacked photodiodes", Proc. SPIE 5210, 105-115 (2004).
G. Finlayson, et al.,"Color by correlation: a simple, unifying framework for color constancy", IEEE Transactions on Pattern Analysis and Machine Intelligence 23, 1209-1221 (2001).
B. Funt, et al.,"Learning color constancy", Proceedings of the Fourth IS&T/SID Color Imaging Conference, pp. 58-60, (1996).
E.H. Land, et al.,"Lightness and retinex theory", J. Opt. Soc. Am. 61, 1-11 (1971).
U.S. Appl. No. 12/789,323, filed May 27, 2010 by Francisco Imai.
U.S. Appl. No. 12/789,334, filed May 27, 2010 by Francisco Imai.
U.S. Appl. No. 12/772,841, filed May 3, 2010 by Francisco Imai.

\* cited by examiner

IMAGE CAPTURE WITH IDENTIFICATION OF ILLUMINANT

FIELD

The present disclosure relates to image capture with an identification of an imaging property of a scene being captured, such as an identification of the illuminant or illuminants of the scene being captured, and more particularly relates to both still and video image capture with good color balance.

BACKGROUND

In human color vision, color constancy is the ability of the visual system to preserve the appearance of an object under a wide range of light sources. For example, because of color constancy in human color vision, colored objects are perceived such that they largely maintain their color appearance even under illuminants that differ greatly.

Imaging systems, either film or electronic photo-sensors, lack this ability and thus do not exhibit color constancy. It is therefore incumbent on the operator to ensure that an image is captured with good color balance, for example, white balance.

In shooting film, color balance is typically achieved by using color correction filters over lighting for the scene or over the camera lens. Image data acquired by imaging photo-sensors must be transformed from the acquired values to new values that are appropriate for color reproduction or display. Several aspects of the acquisition and display process make such color correction important, including the facts that the acquisition sensors do not match the sensors in the human eye; that the properties of the display medium must be accounted for; and that the ambient viewing conditions of the acquisition differ from the display viewing conditions.

In photography and image processing, color balance is sometimes thought of as the global adjustment of the intensities of the colors (typically red, green, and blue primary colors). An important goal of this adjustment is to render specific colors, in particular neutral colors, correctly; hence, the general method is sometimes called gray balance, neutral balance, or white balance. Color balance changes the overall mixture of colors in an image and is used for color correction. An image that is not color balanced is said to have a color cast, or to exhibit color failure, as everything in the image appears to have been shifted towards one color or another. Color balancing may be thought in terms of removing this color cast.

Algorithms and techniques used to attain color constancy are frequently used for color balancing. Conceptually, color balancing consists of two steps: first, determining the illuminant under which an image was captured; and second, scaling the channels of the image to eliminate the color cast. There is a large literature on how one might estimate the ambient illumination from the camera data and then use this information to transform the image data. A variety of algorithms have been proposed such as Bayesian method, artificial neural network, or retinex. An example of a Bayesian method is provided at G. Finlayson, P. M. Hubel and S. Hordley, "Color by correlation: a simple, unifying framework for color constancy", IEEE Transactions on Pattern Analysis and Machine Intelligence 23, 1209-1221 (2001). An example of artificial neural network is provided at B. Funt, V. Cardei and K. Barnard, "Learning color constancy", in Proceedings of the Fourth IS&T/SID Color Imaging Conference, pp. 58-60, 1996. An example of retinex is provided at E. H. Land and J. McCann, "Lightness and retinex theory", J. Opt. Soc. Am. 61, 1-11 (1971).

Currently, the most common implementation of illuminant estimation in digital cameras is based on variations of Bayesian method by calculating ratios of the channels, for example, red/green or red/blue and estimating the illumination based on statistics of these ratios.

SUMMARY

There is no known color balance algorithm that always works accurately in conventional cameras for arbitrary scenes with arbitrary illuminants. This limitation is related to issues of robustness, scenes with multiple illuminants with different color temperatures, and irrecoverability of a balanced scene, among others. These issues are explored more fully below.

Robustness: Statistical methods are based on training sets and statistics based on scene assumptions. Moreover, with three color channels with fixed sensitivities, there are not sufficient degrees of freedom to unequivocally find out the correct illuminant.

Consider a simple example using a conventional digital camera which outputs RGB color signals for each pixel with RGB color spectral sensitivities that mimic the RGB color sensitivities of the human eye. Further consider the use of such a camera in two different scenarios: a first scenario where the camera captures an image of a white sheet of paper under the yellowish illumination of a tungsten-halogen illuminant, and a second scenario where the same camera captures an image of a yellow sheet of paper under the blue-ish illumination of a daylight illuminant such as D65.

Despite the significant differences in these two scenarios, with respect to the data for pixels representing the sheets of paper, the RGB components of these data will be nearly identical. That is, a conventional digital camera is unable to differentiate between a white sheet of paper under a yellowish tungsten-halogen illuminant, and a yellow sheet of paper under a daylight illuminant. As a consequence, despite the material differences in these scenarios, a conventional digital camera is unable to correctly deduce the nature of the illuminant.

Scenes with multiple illuminants with different color temperatures: Even in scenes with multiples illuminants, conventional illuminant estimation is performed globally. As a consequence, the estimated illuminant for nearly every region of the scene will be wrong, leading to color casts for all areas covered by every illumination. In order to correct all color cast areas, it is necessary to consider a method that allows color balance for regions illuminated by each illuminant.

Consider for example a scene having different illuminants in the left and right halves, such as a scene in whose left half a yellow paper is illuminated by daylight illuminant with blue color cast while in its right half a white paper is illuminated by halogen lamp with a yellow cast. This type of scene can happen in daily life, for example, a living room scene where a reading halogen lamp illuminates a book while there are also objects in the same scene illuminated by external daylight through the window.

Other examples of scenes with multiple illuminants with different correlated color temperatures (CCT) are easily conceived. Consider another example of a mountain scene at dusk in which the mountain is illuminated with horizon light from sunset with correlated color temperature (CCT) of around 2,000 K, whereas surrounded valleys are illuminated by a dark blue sky with CCT around 20,000 K. It is evident that this scene captured by a conventional RGB camera has color casts in both regions illuminated directly by sun and indirect illuminant from dark blue sky. Consider further another example of a typical office scene showing a computer screen with typical CCT of 9,000 K, office fluorescent illumination with CCT of 4,000 K and daylight from exterior windows with CCT of around 6,000 K. By setting color balance to automatic, a conventional digital camera might capture an image where exterior objects visible through the windows might look balanced, but the interior of the office and the computer screen both present color casts.

Irrecoverability of balanced scene: Images captured with strong cast often cannot be balanced completely because it is common to have a saturated channel or channels. Once a channel is saturated it is not possible to accurately recover information. Even if the illuminant is estimated correctly it is not possible to recover information that is lost. On the other side, unbalanced images often have a low-level noisy channel that will deteriorate the final image quality because of scaling. Perhaps one technique to avoid this issue is by adjusting the channel sensitivities before capturing the image or by using the appropriate filtering during capture, although this latter approach decreases overall sensitivity.

In recognition of the foregoing, the specification herein describes further advances in the current state of the art.

Recently, imaging assemblies have been developed in which the imaging assemblies have a tunable spectral response. Two examples of such imaging assemblies are described here. In the first example of imaging assemblies which have a tunable spectral response, there are imaging assemblies where the image sensor itself has a tunable spectral response. For instance, there is an image sensor described in "The Transverse Field Detector: A Novel Color Sensitive CMOS Device", Zaraga, IEEE Electron Device Letters 29, 1306-1308 (2008) and U.S. Patent Publication No. 2010/0044822, the contents of which are incorporated herein by reference. These documents describe a transverse field detector (TFD) which has a tunable spectral responsivity that can be adjusted by application of bias voltages to control electrodes. Each pixel outputs signals for a red-like channel, a green-like channel, and a blue-like channel In some of these image sensors, the spectral responsivity is tunable globally, meaning that all pixels in the image sensor are tuned globally to the same spectral responsivity.

In some others of these image sensors, the spectral responsivity is tunable on a pixel by pixel basis or a region-by-region basis. Bias voltages are applied in a grid-like spatial mask, such that the spectral responsivity of each pixel is tunable individually of other pixels in the image sensor, or such that the spectral responsivity of each region comprising multiple pixels is tunable individually of other regions in the image sensor.

In the second example of imaging assemblies which have a tunable spectral response, there are imaging assemblies where the image sensor is preceded by a color filter array (CFA), and it is the color filter array that has a tunable spectral response. In the first example described above, because the image sensor itself has a tunable spectral response, it might be customary to omit a preceding color filter array, since the inclusion of any filter necessarily would decrease the signal-to-noise ratio by filtering the amount of light incident on the image sensor. In contrast, in this second example, the spectral responsivity of the image sensor is not necessarily tunable, but the spectral responsivity of a preceding color filter array is. For instance, there is a tunable color filter array described in U.S. Pat. No. 6,466,961 by Miller, "Methods for Adaptive Spectral, Spatial and Temporal Sensing for Imaging Applications", the content of which is incorporated herein by reference. This document describes an imaging assembly comprising a color filter array which precedes an image sensor whose spectral responsivity is constant, but in which the color filter array itself has a tunable spectral responsivity that can be adjusted by application of bias voltages to control electrodes. Each array element thus filters light incident on corresponding pixels of the image sensor, and the image sensor thereafter outputs signals from which a red-like channel, a green-like channel, and a blue-like channel, can all be derived for each pixel. In the case of a color filter array with temporal sensing, the channels for each pixel may be output sequentially, one after the other. In the case of a color filter array with spatial sensing, the channels for each pixel may be output simultaneously or nearly so, although demosaicing might be required depending on the geometry of the color filter array.

In some of these color filter arrays, the spectral response is tunable globally, resulting in a situation where corresponding channels for all pixels in the image sensor are tuned globally to the same spectral responsivity.

In some others of these color filter arrays, the spectral responsivity is tunable on a pixel by pixel basis or a region-by-region basis. Bias voltages are applied in a grid-like spatial mask, such that the spectral responsivity for each pixel is tunable individually of other pixels, or such that the spectral responsivity for each region comprising multiple pixels is tunable individually of other regions.

According to an aspect of the disclosure herein, an image-capture device is provided with an imaging assembly configured to capture an image and acquire image data. The imaging assembly has tunable sensitivities controlled by a capture parameter, such as voltages applied to each pixel of an image sensor which has tunable spectral responsivity, or such as voltages that are applied to each array element of a color filter array which has tunable spectral responsivity. The color sensitivities for each pixel are thereby adjusted in accordance with a spatial mask.

According to another aspect of the disclosure herein, an imaging property for a scene is identified, such as a color balance property or a high-dynamic range property. Two images of the scene are captured with two sets of different capture parameters. The capture parameters may be applied, and the two images of the scene captured, when a shutter is half pressed. The two sets of capture parameters may be pre-designated, and the differences are designed to provide good discrimination for the imaging property. The imaging property for the scene is identified based on a comparison of the two images. The imaging property may be identified individually for different regions of the scene, in which case the two captured images may be divided into plural regions based on statistics of the images. In some embodiments, based on the imaging property (or properties) thus identified, a third capture parameter may be derived, wherein the third capture parameter is designed for capture of the scene with accuracy for the identified imaging property. The third capture parameter is applied to a tunable imaging assembly and a final image of the scene is captured, such as when a shutter is fully pressed.

According to another aspect of the disclosure herein, automatic color balance adjustments on an image-capture device is provided. Two consecutive scenes are captured with two sets of different capture parameters such as capture parameters that alter spectral sensitivities. The capture parameters may be applied by applying two sets of pre-programmed spatial masks when a shutter is half pressed. The pre-programmed spatial masks are designed and optimized to provide good discrimination between individual ones of a wide range of illuminants. The image is divided into a plurality of regions according to statistics from the captured channels. Color sensitivities for each region of the scene are adjusted based on a comparison of the two captured scenes. Each region from the plurality of regions may have the color balance value adjusted by providing appropriate voltage spatial mask rather than a global color balance adjustment. Thus, not only is a more robust color balance provided, but also color balancing of scenes with multiple illuminants.

According to yet another aspect of the disclosure herein, high-dynamic range imaging on an image-capturing device is provided. Two consecutive scenes are captured with two sets of different capture parameters such as capture parameters that alter spectral sensitivities. The capture parameters may be applied by applying two sets of pre-programmed spatial masks when a shutter is half pressed. The spatial masks are designed to capture highlight and shadows of the scene. The image is divided into a plurality of regions according to the statistics from the captured channels. Color sensitivities for each region of the scene are adjusted based on a comparison of the two captured scenes. Each region from the plurality of regions may have the exposure value adjusted by providing appropriate voltage spatial mask rather than a global exposure adjustment. Thus, a more efficient way is provided for capture of high-dynamic range scenes in one shot after scene analysis.

According to yet another aspect of the disclosure herein, spectral imaging on an image-capturing device is provided. Two consecutive scenes are captured with two sets of different capture parameters such as capture parameters that alter spectral sensitivities. The capture parameters may be applied by applying two sets of pre-programmed spatial masks when a shutter is half pressed. The spatial masks are designed to capture the diversity of spectral information in the scene. The image is divided into a plurality of regions according to the statistics from the captured channels. Color sensitivities for each region of the scene are adjusted based on a comparison of the two captured scenes, to provide color sensitivities that correlate with the wavelengths of relevant features from each areas of the scene. Each region from the plurality of regions may have the exposure value adjusted by providing appropriate voltage spatial mask. Thus, not only is a more efficient way provided for capture of spectral images in one shot after scene analysis, but also customization of color sensitivities to capture important spectral features for each region of the scene.

In yet another aspect, the disclosure herein describes image capture of a scene in which the illuminant or illuminants of the scene are identified, such as for use in color correction or white balance. An image capture device includes an imaging assembly having a spectral response which is tunable in accordance with a capture parameter, such as an imaging assembly with an image sensor which has a tunable spectral response or an imaging assembly with an image sensor and a preceding color filter array which has a tunable spectral response. A first capture parameter is applied to the imaging assembly, and a first image of the scene is captured using the imaging assembly whose spectral response is tuned in accordance with the first capture parameter. A second capture parameter is applied to the imaging assembly, wherein the second capture parameter is different from the first capture parameter, and a second image of the scene is captured by using the imaging assembly whose spectral response is tuned in accordance with the second capture parameter. The first and second images of the scene are compared to identify an illuminant for the scene, or to identify multiple illuminants in respective ones of multiple regions in the scene. In accordance with the illuminant(s) identified for the scene, a third capture parameter is derived wherein the third capture parameter is derived so as to obtain white balance in accordance with each identified illuminant. The third capture parameter is applied to the imaging assembly, and a final image of the scene is captured, or an additional iteration is applied so as to fine-tune color balance of the scene.

In the comparison of the first and second images, the first and second images are compared to identify multiple regions of the scene having a similar illuminant, or to identify multiple regions in the scene having illuminants that differ from one another. In such an embodiment, multiple third capture parameters may be derived, one each for each of such multiple regions, wherein each such third capture parameter is applied to the imaging assembly in correspondence to each of such multiple regions.

In some embodiments described herein, the first and second capture parameters are sufficiently different from each other so as to provide good discrimination for the imaging property of interest. For example, the first and second capture parameters may differ from each other such that first and second image data captured under a variety of different illuminants differs by more than a threshold value as between each different pair of illuminants. In some embodiments, one set of capture parameters might cause a blue-shift in spectral sensitivity relative to the other set of capture parameters.

The imaging assembly may provide three or more channels of information for each pixel of the scene, including a red-like channel, a blue-like channel and a green-like channel. In such an embodiment, in the comparison of the first and second images of the scene, the first and second images may be compared by using ratios of the channels.

According to further aspects described herein, an image capture device includes an imaging assembly with a tunable spectral responsivity and having an image sensor arranged in an array of pixels. The spectral responsivity for each pixel is tunable based on a capture parameter such as a capture parameter in an arrayed mask of capture parameters arranged in correspondence to the array of pixels. A mask of first capture parameters is applied to the imaging assembly. A first image of a scene is captured, wherein the first image of the scene is captured by using the imaging assembly with spectral responses adjusted in accordance with the first capture parameters in the mask. Scene properties of the first image are analyzed so as to determine one or more imaging properties of the scene, such as imaging properties relating to visibility of details in the first image of the scene, dynamic range of the first image of the scene, and/or color balance of the first image of the scene. The first capture parameters in the mask are modified so as to obtain second capture parameters, wherein each capture parameter is modified by calculations that use the scene parameters, and wherein the calculations for one capture parameter are independent of the calculations for all other capture parameters. The mask of second capture parameters is applied to the imaging assembly, and a second image of the scene is captured, wherein the second image of the scene is captured by using the imaging assembly with spectral responses adjusted in accordance with the second capture parameters in the mask.

In some embodiments described herein, the first capture parameters are all the same initial and pre-designated capture parameters. The pre-designated capture parameters may be predesignated pixel-based spatial values set to compensate for spatial and spectral non-uniformities between the pixels in the image sensor. The scene parameters may indicate an amount of compensation needed for color balance, and/or for signal attenuation or boost.

In some embodiments, there may be an iterated repetition of an analysis of scene properties of the second image so as to determine one or more of the aforementioned imaging properties of the scene; a modification of the second capture parameters in the mask so as to obtain third capture parameters, wherein each capture parameter is modified by calculations that use the scene parameters, and wherein the calculations for one capture parameter are independent of the calculations for all other capture parameters; an application of the mask of third capture parameters to the imaging assembly; and a capture of a third image of the scene, wherein the third image of the scene is captured by using the imaging assembly with spectral responses adjusted in accordance with the third capture parameters in the mask. The scene parameters may include an iteration flag indicative of whether further iterations are needed, and the scene parameters may include a multi-capture flag indicative of whether the scene comprises a high dynamic range (HDR) scene or a multispectral scene. Multiple second images may be captured in accordance with the multi-capture flag.

In further aspects described herein, there is an iterative correction of spatial non-uniformity of an image sensor arranged in an array of pixels with adjustable spectral responsivities for each pixel. Initial capture parameters are applied for each pixel using a pixel-based spatial electronic mask, and a first image is captured with the initial capture parameters in the pixel-based spatial electronic mask. There is an analysis of spatial uniformity in light sensitivity and color temperature of the captured image, followed by a determination of whether the spatial uniformity is or is not within pre-established tolerances. The pixel-based electronic spatial mask is stored in memory for use with further image captures, in a case where the spatial uniformity is determined to be within the pre-established tolerances. On the other hand, in a case where the spatial uniformity is determined not to be within the pre-established tolerances, modified capture parameters are generated for each pixel in the pixel-based spatial electronic mask, wherein the modified capture parameters at least partially compensate for the spatial non-uniformity, and the steps of capturing, analyzing and determining, are repeatedly iterated.

This brief summary has been provided so that the nature of this disclosure may be understood quickly. A more complete understanding can be obtained by reference to the following detailed description and to the attached drawings.

DETAILED DESCRIPTION

In the following example embodiments, there is described a digital camera which may be a digital still camera or a digital video camera. It is understood, however, that the following description encompasses arbitrary arrangements which can incorporate or utilize such imaging assemblies having a spectral response which is tunable in accordance with a capture parameter, for instance, a data processing apparatus having an image sensing function (e.g., a personal computer) or a portable terminal having an image sensing function (e.g., a mobile telephone).

<FIGS. 1 to 16>

Figure 1:
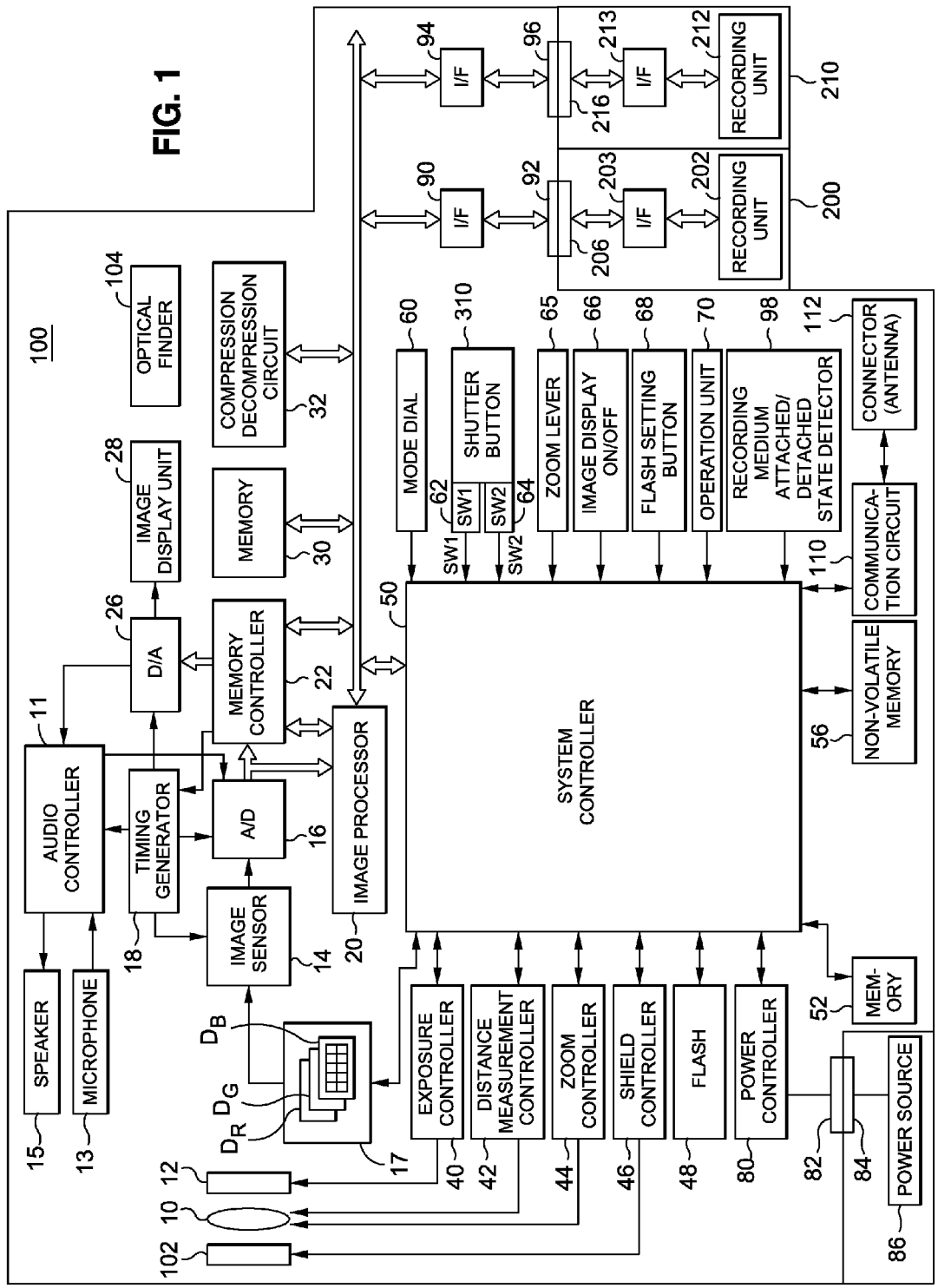
FIG. 1 is a block diagram showing an example embodiment of a digital camera.

FIG. 1 is a block diagram showing an example of the arrangement of the digital camera 100 as an image capturing device according to this embodiment. Referring to FIG. 1, reference numeral 10 denotes an imaging lens; 12, a shutter having an aperture function; and 14, an image sensor which has a spectral response which is tunable in accordance with a capture parameter, which converts an optical image into an electrical signal. Reference numeral 16 denotes an A/D converter which converts an analog signal into a digital signal. The A/D converter 16 is used when an analog signal output from the image sensor 14 is converted into a digital signal and when an analog signal output from an audio controller 11 is converted into a digital signal. Reference numeral 102 denotes a shield, or barrier, which covers the image sensor including the lens 10 of the digital camera 100 to prevent an image capturing system including the lens 10, shutter 12, and image sensor 14 from being contaminated or damaged.

In FIG. 1, an imaging assembly is comprised of image sensor 14 and associated optics, such that in some embodiments the imaging assembly is comprised of image sensor 14 and lens 10.

The optical system 10 may be of a zoom lens, thereby providing an optical zoom function. The optical zoom function is realized by driving a magnification-variable lens of the optical system 10 using a driving mechanism of the optical system 10 or a driving mechanism provided on the main unit of the digital camera 100.

A light beam (light beam incident upon the angle of view of the lens) from an object in a scene that goes through the optical system (image sensing lens) 10 passes through an opening of a shutter 12 having a diaphragm function, and forms an optical image of the object on the image sensing surface of the image sensor 14. The image sensor 14 converts the optical image to analog image signals and outputs the signals to an A/D converter 16. The A/D converter 16 converts the analog image signals to digital image signals (image data). The image sensor 14 and the A/D converter 16 are controlled by clock signals and control signals provided by a timing generator 18. The timing generator 18 is controlled by a memory controller 22 and a system controller 50.

Image sensor 14 is an image sensor which has a spectral response which is tunable in accordance with a capture parameter 17. For each pixel, image sensor 14 outputs three or more channels of color information, including a red-like channel, a green-like channel and a blue-like channel. The precise nature of the spectral responsivity of image sensor 14 is controlled via capture parameter 17. In this embodiment, capture parameter 17 may be comprised of multiple spatial masks, with one mask each for each channel of information output by image sensor 14. Thus, in this example, where image sensor 14 outputs three or more channels, capture parameter 17 includes a spatial mask DR for the red-like channel of information, a spatial mask DG for the green-like channel of information, and a spatial mask DB for the blue-like channel of information. Each spatial mask comprises an array of control parameters corresponding to pixels or regions of pixels in image sensor 14. The spectral responsivity of each pixel, or each region of plural pixels, is thus tunable individually and independently of other pixels or regions of pixels.

Image sensor 14 may be comprised of a transverse field detector (TFD) sensor mentioned hereinabove. Spatial masks DR, DG and DB may correspond to voltage biases applied to control electrodes of the TFD sensor.

Reference numeral 18 denotes a timing generator, which supplies clock signals and control signals to the image sensor 14, the audio controller 11, the A/D converter 16, and a D/A converter 26. The timing generator 18 is controlled by a memory controller 22 and system controller 50. Reference numeral 20 denotes an image processor, which applies resize processing such as predetermined interpolation and reduction, and color conversion processing to data from the A/D converter 16 or that from the memory controller 22. The image processor 20 executes predetermined arithmetic processing using the captured image data, and the system controller 50 executes exposure control and ranging control based on the obtained arithmetic result.

As a result, TTL (through-the-lens) AF (auto focus) processing, AE (auto exposure) processing, and EF (flash pre-emission) processing are executed. The image processor 20 further executes predetermined arithmetic processing using the captured image data, and also executes TTL AWB (auto white balance) processing based on the obtained arithmetic result. It is understood that in other embodiments, optical finder 104 may be used in combination with the TTL arrangement, or in substitution therefor.

Output data from the A/D converter 16 is written in a memory 30 via the image processor 20 and memory controller 22 or directly via the memory controller 22. The memory 30 stores image data which is captured by the image sensor 14 and is converted into digital data by the A/D converter 16, and image data to be displayed on an image display unit 28. The image display unit 28 may be a liquid crystal screen. Note that the memory 30 is also used to store audio data recorded via a microphone 13, still images, movies, and file headers upon forming image files. Therefore, the memory 30 has a storage capacity large enough to store a predetermined number of still image data, and movie data and audio data for a predetermined period of time.

A compression/decompression unit 32 compresses or decompresses image data by adaptive discrete cosine transform (ADCT) or the like. The compression/decompression unit 32 loads captured image data stored in the memory 30 in response to pressing of the shutter 310 as a trigger, executes the compression processing, and writes the processed data in the memory 30. Also, the compression/decompression unit 32 applies decompression processing to compressed image data loaded from a detachable recording unit 202 or 212, as described below, and writes the processed data in the memory 30. Likewise, image data written in the memory 30 by the compression/decompression unit 32 is converted into a file by the system controller 50, and that file is recorded in the recording unit 202 or 212, as also described below.

The memory 30 also serves as an image display memory (video memory). Reference numeral 26 denotes a D/A converter, which converts image display data stored in the memory 30 into an analog signal, and supplies that analog signal to the image display unit 28. Reference numeral 28 denotes an image display unit, which makes display according to the analog signal from the D/A converter 26 on the liquid crystal screen 28 of an LCD display. In this manner, image data to be displayed written in the memory 30 is displayed by the image display unit 28 via the D/A converter 26.

The exposure controller 40 controls the shutter 12 having a diaphragm function based on the data supplied from the system controller 50. The exposure controller 40 may also have a flash exposure compensation function by linking up with a flash (flash emission device) 48. The flash 48 has an AF auxiliary light projection function and a flash exposure compensation function.

The distance measurement controller 42 controls a focusing lens of the optical system 10 based on the data supplied from the system controller 50. A zoom controller 44 controls zooming of the optical system 10. A shield controller 46 controls the operation of a shield (barrier) 102 to protect the optical system 10.

Reference numeral 13 denotes a microphone. An audio signal output from the microphone 13 is supplied to the A/D converter 16 via the audio controller 11 which includes an amplifier and the like, is converted into a digital signal by the A/D converter 16, and is then stored in the memory 30 by the memory controller 22. On the other hand, audio data is loaded from the memory 30, and is converted into an analog signal by the D/A converter 26. The audio controller 11 drives a speaker 15 according to this analog signal, thus outputting a sound.

A nonvolatile memory 56 is an electrically erasable and recordable memory, and uses, for example, an EEPROM. The nonvolatile memory 56 stores constants, computer-executable programs, and the like for operation of system controller 50. Note that the programs include those for execution of various flowcharts.

Figure 1A:
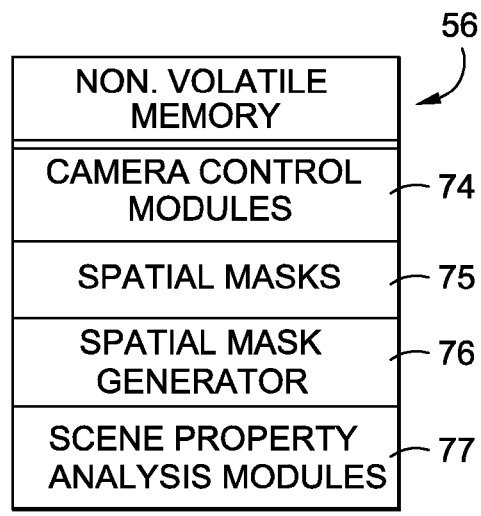
FIG. 1A is a view for explaining the architecture of modules according to an example embodiment.

In particular, and as shown in FIG. 1A, non-volatile memory 56 is an example of a non-transitory computer-readable memory medium, having stored thereon camera control modules 74 as described herein. Also stored thereon are pre-designated capture parameters for application to image sensor 14 so as to control spectral responsivity of the image sensor. In this embodiment, the capture parameters are comprised of spatial masks 75 so as to permit pixel-by-pixel or region-by-region control of spectral responsivity, independently of other pixels or regions. A spatial mask generator 76 generates masks, such as by providing one of pre-designated masks 75 or by deriving a new mask. The derived mask may be based on a comparison of captured images, or may be based on a comparison of scene properties as provided by scene property analysis module 77.

Reference numeral 50 denotes a system controller, which controls the entire digital camera 100. The system controller 50 executes programs recorded in the aforementioned non-volatile memory 56 to implement respective processes to be described later of this embodiment. Reference numeral 52 denotes a system memory which comprises a RAM. On the system memory 52, constants and variables required to operate system controller 50, programs read out from the nonvolatile memory 56, and the like are mapped.

A mode selection switch 60, shutter switch 310, and operation unit 70 form operation means used to input various operation instructions to the system controller 50.

The mode selection switch 60 includes the imaging/playback selection switch, and is used to switch the operation mode of the system controller 50 to one of a still image recording mode, movie recording mode, playback mode, and the like.

The shutter switch 62 is turned on in the middle of operation (half stroke) of the shutter button 310 arranged on the digital camera 100, and generates a first shutter switch signal SW1. Also, the shutter switch 64 is turned on upon completion of operation (full stroke) of the shutter button 310, and generates a second shutter switch signal SW2. The system controller 50 starts the operations of the AF (auto focus) processing, AE (auto exposure) processing, AWB (auto white balance) processing, EF (flash pre-emission) processing, and the like in response to the first shutter switch signal SW1. Also, in response to the second shutter switch signal SW2, the system controller 50 starts a series of processing (shooting) including the following: processing to read image signals from the image sensing device 14, convert the image signals into image data by the A/D converter 16, process the image data by the image processor 20, and write the data in the memory 30 through the memory controller 22; and processing to read the image data from the memory 30, compress the image data by the compression/decompression circuit 32, and write the compressed image data in the recording medium 200 or 210.

A zoom operation unit 65 is an operation unit operated by a user for changing the angle of view (zooming magnification or shooting magnification). The operation unit 65 can be configured with, e.g., a slide-type or lever-type operation member, and a switch or a sensor for detecting the operation of the member.

The image display ON/OFF switch 66 sets ON/OFF of the image display unit 28. In shooting an image with the optical finder 104, the display of the image display unit 28 configured with a TFT, an LCD or the like may be turned off to cut the power supply for the purpose of power saving.

The flash setting button 68 sets and changes the flash operation mode. In this embodiment, the settable modes include: auto, flash-on, red-eye reduction auto, and flash-on (red-eye reduction). In the auto mode, flash is automatically emitted in accordance with the lightness of an object. In the flash-on mode, flash is always emitted whenever shooting is performed. In the red-eye reduction auto mode, flash is automatically emitted in accordance with lightness of an object, and in case of flash emission the red-eye reduction lamp is always emitted whenever shooting is performed. In the flash-on (red-eye reduction) mode, the red-eye reduction lamp and flash are always emitted.

The operation unit 70 comprises various buttons, touch panels and so on. More specifically, the operation unit 70 includes a menu button, a set button, a macro selection button, a multi-image reproduction/repaging button, a single-shot/serial shot/self-timer selection button, a forward (+) menu selection button, a backward (−) menu selection button, and the like. Furthermore, the operation unit 70 may include a forward (+) reproduction image search button, a backward (−) reproduction image search button, an image shooting quality selection button, an exposure compensation button, a date/time set button, a compression mode switch and the like.

The compression mode switch is provided for setting or selecting a compression rate in JPEG (Joint Photographic Expert Group) compression, recording in a RAW mode and the like. In the RAW mode, analog image signals outputted by the image sensing device are digitalized (RAW data) as it is and recorded.

Note in the present embodiment, RAW data includes not only the data obtained by performing A/D conversion on the photoelectrically converted data from the image sensing device, but also the data obtained by performing lossless compression on A/D converted data. Moreover, RAW data indicates data maintaining output information from the image sensing device without a loss. For instance, RAW data is A/D converted analog image signals which have not been subjected to white balance processing, color separation processing for separating luminance signals from color signals, or color interpolation processing. Furthermore, RAW data is not limited to digitalized data, but may be of analog image signals obtained from the image sensing device.

According to the present embodiment, the JPEG compression mode includes, e.g., a normal mode and a fine mode. A user of the digital camera 100 can select the normal mode in a case of placing a high value on the data size of a shot image, and can select the fine mode in a case of placing a high value on the quality of a shot image.

In the JPEG compression mode, the compression/decompression circuit 32 reads image data written in the memory 30 to perform compression at a set compression rate, and records the compressed data in, e.g., the recording medium 200.

In the RAW mode, analog image signals are read in units of line in accordance with the pixel arrangement of the color filter of the image sensing device 14, and image data written in the memory 30 through the A/D converter 16 and the memory controller 22 is recorded in the recording medium 200 or 210.

Note that the digital camera 100 according to the present embodiment has a plural-image shooting mode, where plural image data can be recorded in response to a single shooting instruction by a user. Image data recording in this mode includes image data recording typified by an auto bracket mode, where shooting parameters such as white balance and exposure are changed step by step. It also includes recording of image data having different post-shooting image processing contents, for instance, recording of plural image data having different data forms such as recording in a JPEG form or a RAW form, recording of image data having the same form but different compression rates, and recording of image data on which predetermined image processing has been performed and has not been performed.

A power controller 80 comprises a power detection circuit, a DC-DC converter, a switch circuit to select the block to be energized, and the like. The power controller 80 detects the existence/absence of a power source, the type of the power source, and a remaining battery power level, controls the DC-DC converter based on the results of detection and an instruction from the system controller 50, and supplies a necessary voltage to the respective blocks for a necessary period. A power source 86 is a primary battery such as an alkaline battery or a lithium battery, a secondary battery such as an NiCd battery, an NiMH battery or an Li battery, an AC adapter, or the like. The main unit of the digital camera 100 and the power source 86 are connected by connectors 82 and 84 respectively comprised therein.

The recording media 200 and 210 comprise: recording units 202 and 212 that are configured with semiconductor memories, magnetic disks and the like, interfaces 203 and 213 for communication with the digital camera 100, and connectors 206 and 216. The recording media 200 and 210 are connected to the digital camera 100 through connectors 206 and 216 of the media and connectors 92 and 96 of the digital camera 100. To the connectors 92 and 96, interfaces 90 and 94 are connected. The attached/detached state of the recording media 200 and 210 is detected by a recording medium attached/detached state detector 98.

Note that although the digital camera 100 according to the present embodiment comprises two systems of interfaces and connectors for connecting the recording media, a single or plural arbitrary numbers of interfaces and connectors may be provided for connecting a recording medium. Further, interfaces and connectors pursuant to different standards may be provided for each system.

For the interfaces 90 and 94 as well as the connectors 92 and 96, cards in conformity with a standard, e.g., PCMCIA cards, compact flash (CF) (registered trademark) cards and the like, may be used. In this case, connection utilizing various communication cards can realize mutual transfer/reception of image data and control data attached to the image data between the digital camera and other peripheral devices such as computers and printers. The communication cards include, for instance, a LAN card, a modem card, a USB card, an IEEE 1394 card, a P1284 card, an SCSI card, and a communication card for PHS or the like.

The optical finder 104 is configured with, e.g., a TTL finder, which forms an image from the light beam that has gone through the lens 10 utilizing prisms and minors. By utilizing the optical finder 104, it is possible to shoot an image without utilizing an electronic view finder function of the image display unit 28. The optical finder 104 includes indicators, which constitute part of the display device 54, for indicating, e.g., a focus state, a camera shake warning, a flash charge state, a shutter speed, an f-stop value, and exposure compensation.

A communication circuit 110 provides various communication functions such as USB, IEEE 1394, P1284, SCSI, modem, LAN, RS232C, and wireless communication. To the communication circuit 110, a connector 112 can be connected for connecting the digital camera 100 to other devices, or an antenna can be provided for wireless communication.

A real-time clock (RTC, not shown) may be provided to measure date and time. The RTC holds an internal power supply unit independently of the power supply controller 80, and continues time measurement even when the power supply unit 86 is OFF. The system controller 50 sets a system timer using a date and time obtained from the RTC at the time of activation, and executes timer control.

Figure 2:
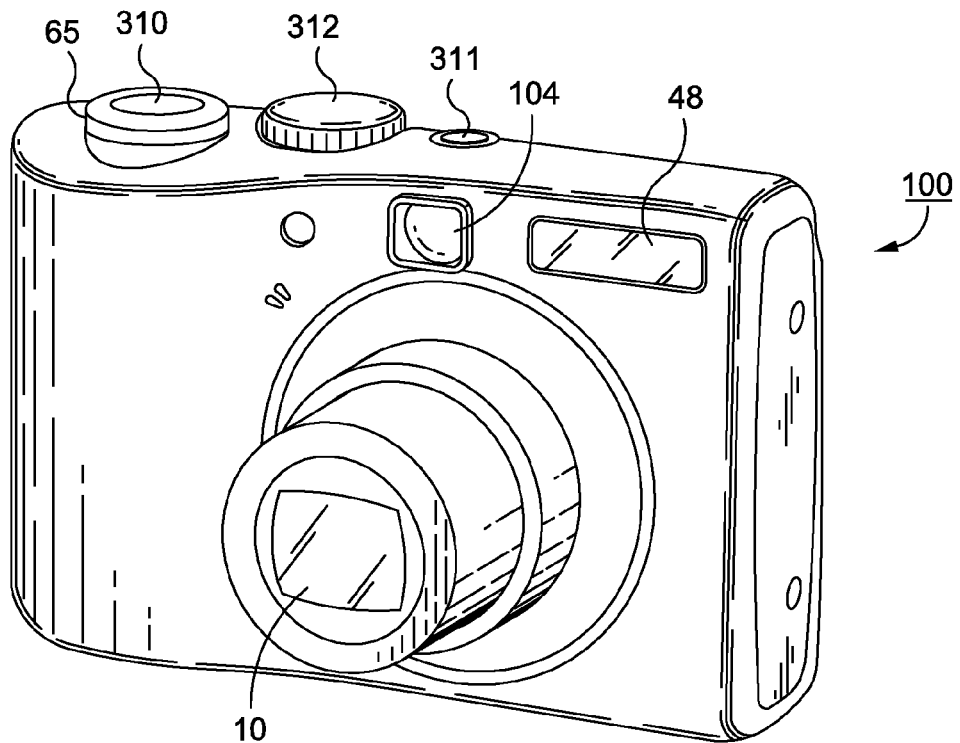
FIGS. 2 and 3 are views showing external appearance of an example embodiment.
Figure 3:
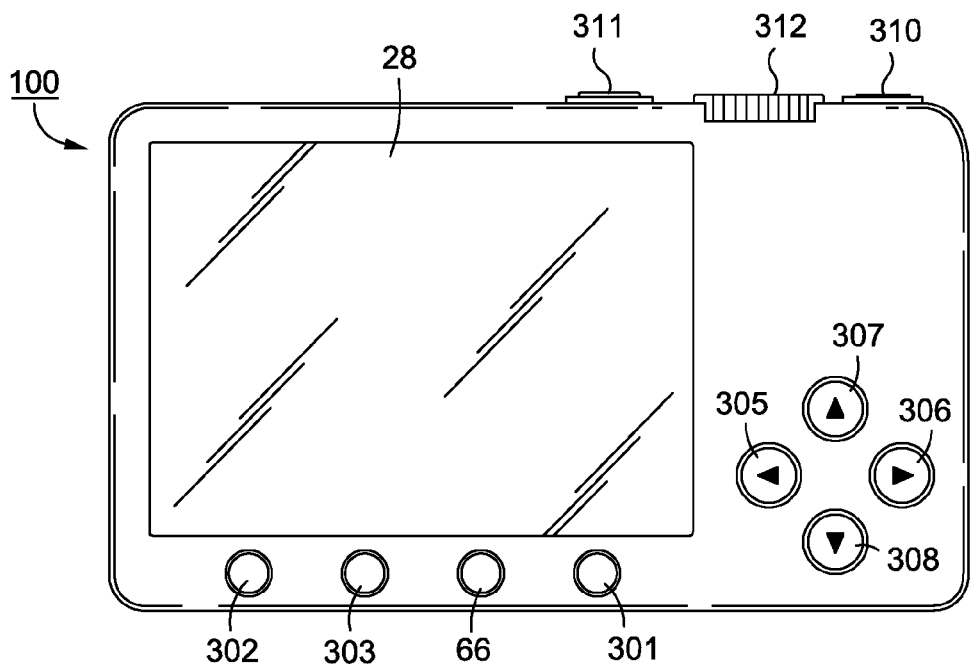

FIGS. 2 and 3 are views showing an example of an external appearance of the digital camera 100. Note in these figures, some components are omitted for description purpose. The aforementioned operation unit 70 comprises, e.g., buttons and switches 301 to 311. A user operates these buttons and switches 301 to 311 for turning ON/OFF the power of the digital camera 100, for setting, changing or confirming the shooting parameters, for confirming the status of the camera, and for confirming shot images.

The power button 311 is provided to start or stop the digital camera 100, or to turn ON/OFF the main power of the digital camera 100. The menu button 302 is provided to display the setting menu such as shooting parameters and operation modes of the digital camera 100, and to display the status of the digital camera 100. The menu has, e.g., a hierarchical structure, and each hierarchy includes selectable items or items whose values are variable.

A delete button 301 is pressed for deleting an image displayed on a playback mode or a shot-image confirmation screen. In the present embodiment, the shot-image confirmation screen (a so-called quick review screen) is provided to display a shot image on the image display unit 28 immediately after shooting for confirming the shot result. Furthermore, the present embodiment is constructed in a way that the shot-image confirmation screen is displayed as long as a user keeps pressing the shutter button 310 after the user instructs shooting by shutter button depression.

An enter button 303 is pressed for selecting a mode or an item. When the enter button 303 is pressed, the system controller 50 sets the mode or item selected at this time. The display ON/OFF button 66 is used for selecting displaying or non-displaying of photograph information regarding the shot image, and for switching the image display unit 28 to be functioned as an electronic view finder.

A left button 305, a right button 306, an up button 307, and a down button 308 may be used for the following purposes, for instance, changing an option (e.g., items, images) selected from plural options, changing an index position that specifies a selected option, and increasing or decreasing numeric values (e.g., correction value, date and time).

Half-stroke of the shutter button 310 instructs the system controller 50 to start, for instance, AF processing, AE processing, AWB processing, EF processing or the like. Full-stroke of the shutter button 310 instructs the system controller 50 to perform shooting.

The zoom operation unit 65 is operated by a user for changing the angle of view (zooming magnification or shooting magnification) as mentioned above.

A recording/playback selection switch 312 is used for switching a recording mode to a playback mode, or switching a playback mode to a recording mode. Note, in place of the above-described operation system, a dial switch may be adopted or other operation systems may be adopted.

Figure 4:
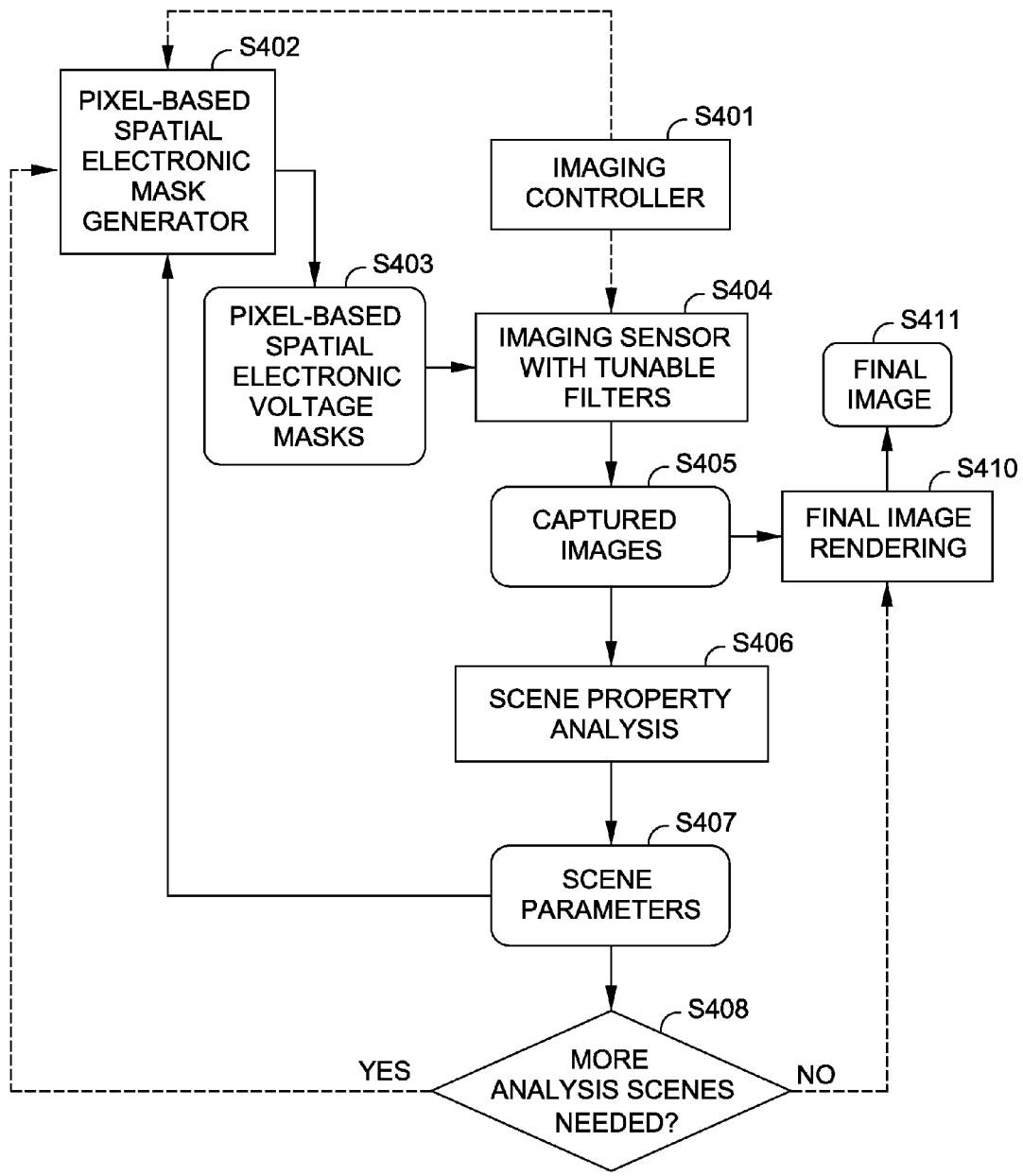
FIG. 4 is a flow diagram for explaining an example embodiment of automatic determination of an imaging property for a scene.

FIG. 4 is a flow diagram for explaining an example embodiment of an automatic determination of optimal imaging properties for specific regions of the image and performing adjustments of, for example, light sensitivity and spectral selectivity on a pixel-by-pixel basis, or a region-by-region basis, for imaging sensors with tunable spectral properties.

Briefly, according to FIG. 4, an imaging property for a scene is identified, such as a color balance property or a high-dynamic range property. Two images of the scene are captured with two sets of different capture parameters. The capture parameters may be applied, and the two images of the scene captured, when a shutter is half pressed. The two sets of capture parameters may be pre-designated, and the differences between them are designed to provide good discrimination for the imaging property. The imaging property for the scene is identified based on a comparison of the two images. The imaging property may be identified individually for different regions of the scene, in which case the two captured images may be divided into plural regions based on statistics of the images. In some embodiments, based on the imaging property (or properties) thus identified, a third capture parameter may be derived, wherein the third capture parameter is designed for capture of the scene with accuracy for the identified imaging property. The third capture parameter is applied to the imaging assembly and a final image of the scene is captured, such as when a shutter is fully pressed.

In step S401, an imaging controller controls spatial electronic mask generator 76 to set-up an initial state for a pixel-by-pixel basis spatial electronic voltage mask that is going to modulate the amplitude and spectral selectivity of an imaging sensor with tunable color sensitivities. The electronic mask can control amplitude and spectra tuning for each pixel. The initial state for the pixel-by-pixel basis spatial mask is given by electronic voltages that has some assumptions about illumination and material properties of the scene and is usually a pre-designated setting determined in advance such as by a calibration procedure that is made in the imaging system assembly line.

Figure 5:
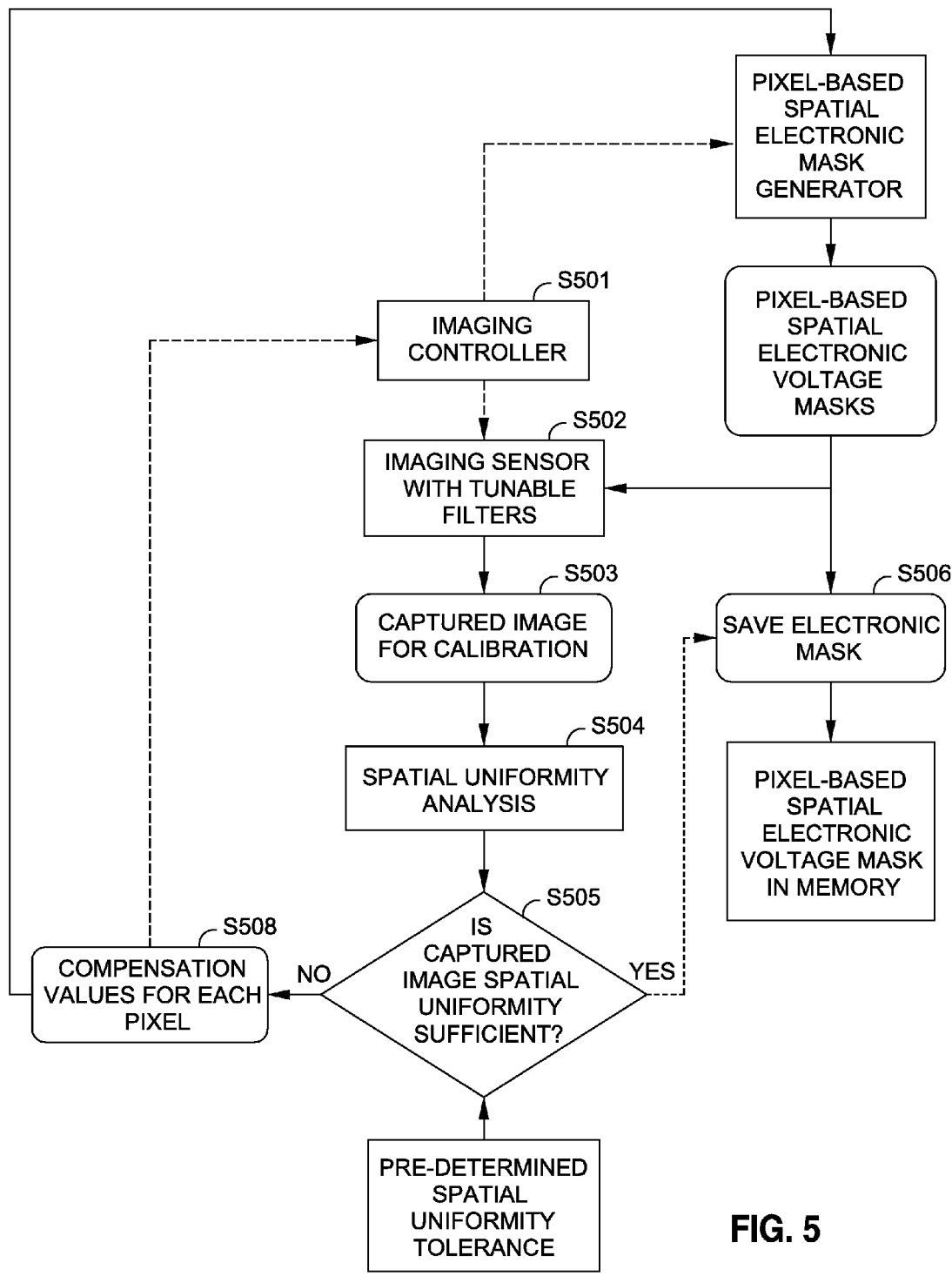
FIG. 5 is a view for explaining an example embodiment for selection of an initial state for an electronic mask which is applied to an imaging sensor in an example embodiment.

One possible example for selection of an initial state for the electronic mask is shown in FIG. 5, which shows an adaptive method to determine initial state pixel-based spatial electronic voltage mask. In this example, one possible setting is by adjusting the voltage in the initial state to produce uniform neutral response for a perfectly uniform and diffuse grey card under D50 illumination. Note that in actual imaging sensors there are non-uniformities in the response of individual pixels due to manufacturing tolerances and the optics used with the sensor will further produce non-uniformities in color and sensitivity. Therefore the voltage values generated for the pixel-by-pixel basis spatial electronic mask are not the same for all pixels, but they ordinarily have values that produce the same image data under the calibration conditions described above. By providing a system for pixel-by-pixel calibration of a tunable imaging sensor it is possible to: (a) compensate for non-uniformities in sensitivity and spectral response in the sensor due to manufacturing; and (b) compensate for non-uniformities in sensitivity and spectral response due to optical aberrations and distortions.

As shown in FIG. 5, all values of the pixel-based spatial electronic voltage mask are set to same default factory value. In step S501, the imaging controller controls the imaging sensor with tunable filters to an initial state mask and captures an image for calibration (steps S502 and S503). In step S504, spatial uniformity analysis is performed and if in step S505 the captured image spatial uniformity is sufficient according to a pre-determined spatial uniformity tolerance, then in step S506 the pixel-based spatial electronic voltage masks is saved in the memory.

If the spatial uniformity of the captured image for calibration is not within specified tolerance, then in step S508 a compensation value is calculated for each pixel and sent to the pixel-based spatial electronic mask generator that creates a new pixel-based spatial electronic voltage mask. Then, in an iterated repetition of step S501, the imaging controller then sends command to the imaging sensor with tunable filters to captures a new calibration image and the captured image for calibration is analyzed for spatial uniformity. This iterative process is repeated until spatial uniformity of the captured image is within the specified tolerance.

The electronic mask for the initial state can be stored in a memory unit once the imaging system is calibrated and it is used every time the imaging system is turned on. The calibration procedure can be repeated for different lenses and illuminants and the calibration saved in the memory unit.

This adaptive imaging system is very versatile and can be employed in several pre-programmed modes. Each mode can be automatically detected by the imaging controller as well. For illustration, some frequently useful modes are: single image enhancement, high-dynamic range imaging and multispectral imaging, but the adaptive imaging system is not limited to these applications.

In the example of FIG. 4, a single image enhancement mode is shown. Returning to FIG. 4, in response to the imaging controller, the pixel-based spatial electronic mask generator supplies a spatial mask (step S402), which in step S403 is applied to the imaging sensor. In steps S404 and S405, the image controller sends a command to the imaging sensor with tunable filters to capture an image using a pre-determined pixel-based spatial electronic mask that was calculated in the calibration stage.

The captured image is analyzed by scene property analysis module 77 in step S406, to determine detail visibility and color balance. For example, shadows in the scene might be too dark to see any detail and highlights of the scene might be saturated. In another example, a scene might be taken under multiple illumination sources with different color temperature, such that the color balance has to be corrected for different parts of the image. The scene property analysis module produces scene parameters (step S407) that can be used to determine if more analysis of scenes is needed (step S408) and which are also provided to the electronic mask generator for determination of a revised spatial mask. Such scene parameters can include, but not limited to, amount of compensation necessary for color balance, signal attenuation or boosting for each area of the image with corresponding image coordinates.

The scene parameters also include a flag signal that indicates if more analysis of scenes is needed, meaning that there are more corrections to be performed and further iterations of scene capture is warranted. If more analysis is necessary the pixel-based spatial electronic mask generator generates a new pixel-based spatial electronic voltage masks with the scene parameters and the image controller controls the imaging sensor with tunable filters to capture a new image. This iterative process continues until a satisfactory image is produced as a final image (steps S410 and S411). This scene property analysis module also determines if a mode with multiple image capture (for high-dynamic range or multispectral imaging) modes are necessary and switches mode for these more advanced modes. There are scenes that can be properly compensated pixel-by-pixel basis in terms of light sensitivity and color but there are scenes whose physical values go beyond what can be captured by one single capture. In such cases, there may be the need to capture multiple images.

Figure 6:
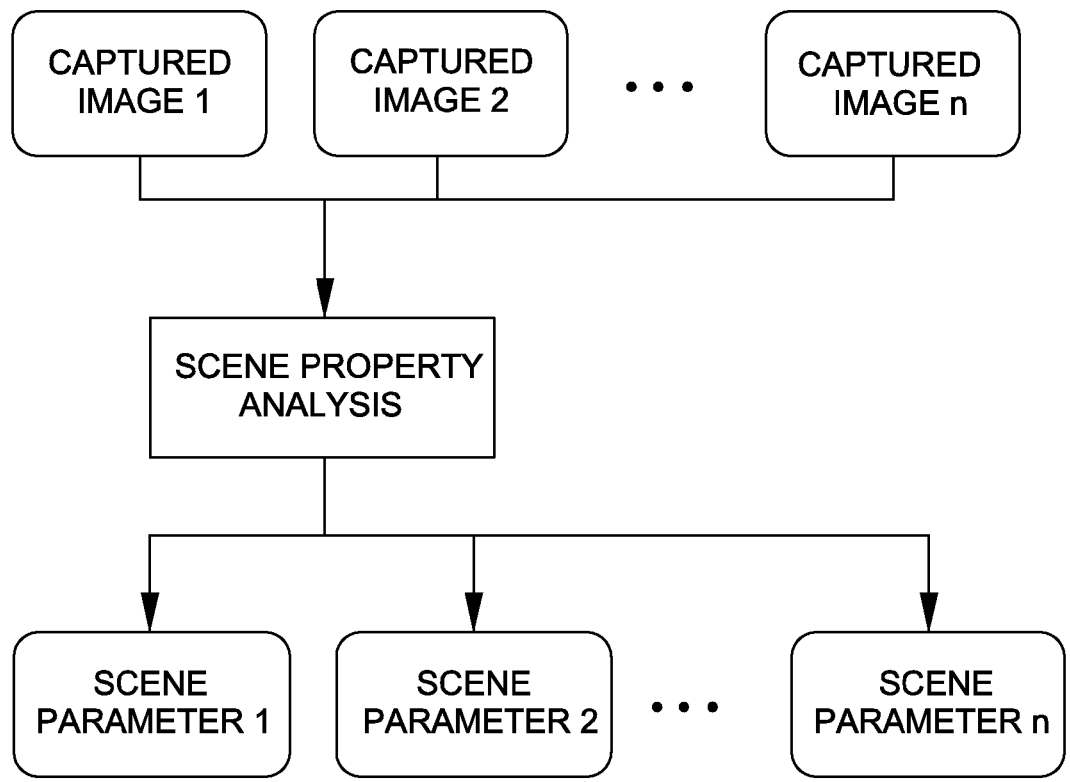
FIG. 6 is a view for explaining sheen property analysis and processing for multiple captured images.

FIG. 6 shows processing for multiple captured images. In particular, in some the high-dynamic range and multispectral imaging modes, the imaging controller sends commands for generation of multiple pixel-based spatial electronic voltage masks for each capture using the imaging sensor with tunable filters to generate multiple captured images, which are shown in FIG. 6. Each captured image is analyzed by the scene property analysis module and multiple scene parameters are generated. The signal parameters have same function as described above for the single image enhancement mode with an additional function to provide the final image rendering module with information of how many images have to be combined and how they are going to be combined to produce the final image.

Thus, the present disclosure contemplates apparatus and method for adaptive imaging to automatically determine optimal imaging parameters for specific regions of the image and perform adjustments of light sensitivity and spectral selectivity on a pixel-by-pixel basis for imaging sensors with tunable spectral properties. As seen herein, there are in combination an imaging sensor with tunable spectral responsivities, an imaging controller that controls the imaging sensor and also a spatial pixel-by-pixel basis electronic mask generation unit that generates pixel-based spatial electronic masks to control the shape of the sensitivity curves of the imaging sensor with tunable spectral responsivities, a scene property analysis module that analyzes the properties of scene based on images captured by the imaging sensor with tunable spectral responsivities using electronic control signals generated by the electronic mask generation unit, and a module that decides to generate new spatial electronic control masks from the results of the scene analysis or to render the final image. One such imaging sensor may be a transverse field detector (TFD) sensor, and the imaging sensor may capture multiple images.

The scene properties analyzed may include dynamic range and spectral properties of the scene (objects and illumination).

Also contemplated herein are iterative methods and apparatus for spatial non-uniformity correction based on an imaging sensor with tunable spectral responsivities, comprising an imaging sensor with tunable spectral responsivities, an initial state for the pixel-based spatial electronic mask, an imaging control that captures an image with initial state pixel-based spatial electronic mask, a scene analysis module that analysis spatial uniformity of captured image, and a decision module that decides if the spatial uniformity is within pre-established tolerances or not. If the criteria of spatial uniformity are met the final pixel-based electronic spatial mask is saved in a memory unit. If the criteria are not met the method goes to the next iteration by generating appropriate spatial compensation for the spatial non-uniformity in light sensitivity and color and appropriate pixel-basis spatial electronic masks are generated for the subsequent image capture.

The scene property analysis of this example works in the following iterative fashion. First, exposure is adjusted to eliminate or reduce or minimize saturated information in the captured image. Once an image taken with correct exposure (leading to minimum saturation) is taken, the scene is analyzed to ensure that there is adequate detail such that acceptable details are visible. If all the details are visible there is no need to take additional pictures. If exposure time is too short for certain areas of the image, the sensitivities of the pixels corresponding to the darker areas of the image have to be boosted (by changing gain electronically in the imaging sensor pixels) before another picture is taken. The picture is then analyzed again and if there is still need to take more pictures with increased sensitivities and so on until all or an acceptable amount of details can be captured. In the implementation of the system it is possible to consider a stopping condition (for example, maximum number of captures or limitations in the range of the tunable filters in the imaging sensor).

For illustrative purposes, five (5) parameters are described, but the disclosure is not limited only to those parameters. Parameter 1 is a continuity flag that indicates to the pixel-based spatial electronic mask generator if there is a need to capture a new image (the pixel-base spatial electronic mask generator communicates this to the imaging controller). Parameter 2 indicates the exposure value (that could be converted to exposure time, aperture or a combination of both). Parameter 3 is a flag that indicates if it is necessary to change the spatial mask. Parameter 4 has the mask coordinates for gain adjustments. These image coordinates are sent to the pixel-based spatial electronic mask generator to indicate which gains will be applied to which pixels (given by the coordinates), thereby generating an electronic mask accordingly. Parameter 5 contains the color mask coordinates indicating which color bias has to be applied to which pixel coordinates to the pixel-based spatial electronic mask generator to generate appropriate electronic masks. If parameter 3 is set to no change, there is no need for parameters 4 and 5.

Figure 7:
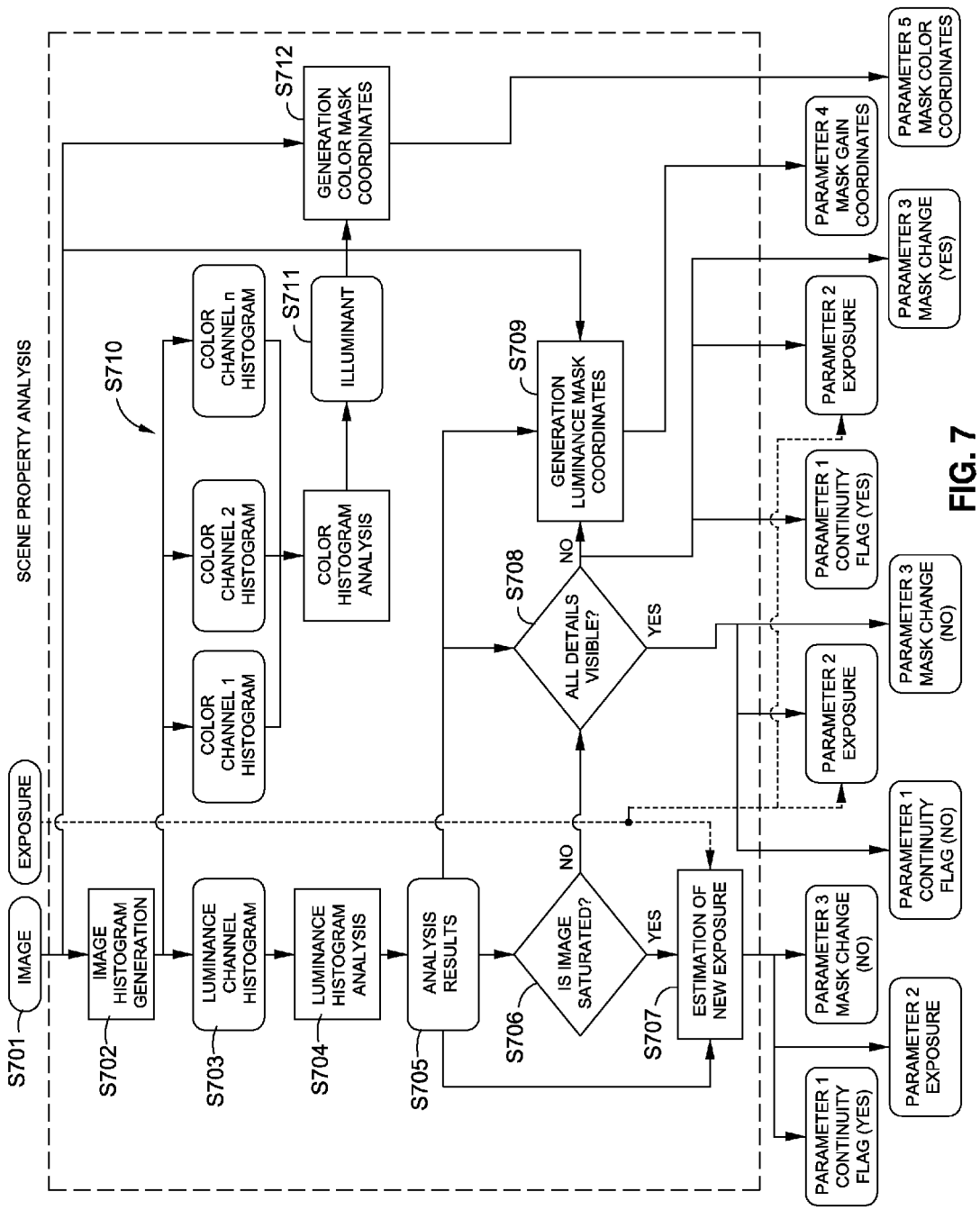
FIG. 7 is a view for explaining an example of scene property analysis for a high-dynamic range imaging mode.

FIG. 7 is a view for explaining an example of scene property analysis for a high-dynamic range imaging mode. The scene property analysis is depicted in FIG. 7 for a high-dynamic range imaging mode. In this mode the scene property analysis module receives an image at S701 (such as Captured Image 1 of FIG. 6) and exposure corresponding to the image.

An image histogram generation module at S702 produces a luminance channel histogram at S703 that is analyzed at S704 by a luminance histogram analysis module to produce analysis results at S705. Typically a histogram analysis will look for percentiles to determine if an image is appropriately exposed but it is not limited to this type of analysis. Based on the analysis results, S706 determines if the image is saturated. One reason for this step is the implicit assumption that most of the image is not saturated. If the image is saturated it may be necessary to decrease the exposure and a new exposure is estimated at S707 based on analysis results and current exposure. If the image is saturated a new exposure is generated to unsaturate the image and parameter 1 is set to continue the iteration, parameter 2 is set with new exposure and parameter 3 is set to produce no mask change. This process is repeated until the image is not saturated.

After determining that saturation is acceptable, S708 tests whether there is an acceptable amount of detail, meaning dark areas in the scene are properly exposed, based on the histogram analysis results. If all details are visible parameter 1 is set to stop the iteration (and this result will render the image), parameter 2 is set with current exposure and parameter 3 is set to not produce any mask change. However, if details are not visible there is a need to generate new luminance mask coordinates. At S709, new luminance mask coordinates are generated based on analysis results and the image. The analysis results give the threshold of luminance value to be used to select pixels that has to be captured with new exposure values. Parameter 1 is set to continue iteration. Parameter 2 is current exposure. Parameter 3 indicates that there is a new electronic mask and parameter 4 contains the gain bias and coordinates for the mask generation.

In the embodiment of FIG. 7, multi-illumination compensation in a scene is also addressed by analyzing color channel histograms generated by the image histogram generation module. The color histograms are analyzed as indicated generally at S710 to estimate illuminant (S711) per region that is used in conjunction with image to generate color mask coordinates. As indicated at S712, color mask coordinates are generated, and contain information on color bias and pixel coordinates for storage in parameter 5. This process is repeated until the unsaturated image produces an image that has good visibility. The color processing module should guarantee that the final rendering image is well balanced.

The same scene property analysis mode can be used in a multi-spectral imaging system by storing images with different color bias settings and rendering image in the end of the process.

Other examples may be developed in accordance with the description herein for use of an imaging assembly which has a spectral response which is tunable in accordance with a capture parameter, such as an imaging assembly with an image sensor which has a tunable spectral response or an imaging assembly with an image sensor and a preceding color filter array which has a tunable spectral response. Such examples may address color balancing, dynamic range adjustment, spectral imaging independently for several areas of the imaging frame with one capture after image analysis, and/or combinations thereof. For purposes of illustration, the following description focuses almost entirely on color balance.

In accordance with this aspect, the disclosure herein describes image capture of a scene in which the illuminant or illuminants of the scene are identified, such as for use in color correction or white balance. An image capture device includes an imaging assembly having a spectral response which is tunable in accordance with a capture parameter, such as an imaging assembly with an image sensor which has a tunable spectral response or an imaging assembly with an image sensor and a preceding color filter array which has a tunable spectral response. A first capture parameter is applied to the imaging assembly, and a first image of the scene is captured using the imaging assembly whose spectral response is tuned in accordance with the first capture parameter. A second capture parameter is applied to the imaging assembly, wherein the second capture parameter is different from the first capture parameter, and a second image of the scene is captured by using the imaging assembly whose spectral response is tuned in accordance with the second capture parameter. The first and second images of the scene are compared to identify an illuminant for the scene, or to identify multiple illuminants in respective ones of multiple regions in the scene. In accordance with the illuminant(s) identified for the scene, a third capture parameter is derived wherein the third capture parameter is derived so as to obtain white balance in accordance with each identified illuminant. The third capture parameter is applied to the imaging assembly, and a final image of the scene is captured, or an additional iteration is applied so as to fine-tune color balance of the scene.

Briefly, to identify regions in a scene that have different illuminants, a multi-stage technique may be applied, including a stage for image preview capture, a stage for analysis, a stage for image compensation, and a stage for final capture.

In the image preview capturing stage, the imaging system captures two images with two different sets of spectral sensitivities. In each set the same spectral sensitivities may be used for all pixel of the imaging sensor frame. For example, on a half-press of the shutter the imaging system first captures a frame with RGB sensitivities for each pixel of the imaging sensor and sends it to an image buffer. Soon after the imaging system captures another image with sensitivities tuned now to R'G'B', and this image is also sent to an image buffer.

In the analysis stage, there may be ratio calculations of the RGB and R'G'B' outputs, such as calculation of r/g, r/b, r'/g' and r'/b', and such ratios may be calculated for each pixel. Based for example on expectations for ranges of ratios, which may be predetermined by calibration and pre-stored in a look-up table (LUT), an illuminant is determined for each pixel of the scene or for each region of plural pixels of the scene. Image segmentation is thereafter applied, such that clusters of pixels with similar ratios are grouped together based on the rationale that pixels with similar ratios correspond to same illuminant, and the image is segmented into regions.

In the image compensation stage, white balance is compensated for the scene, including white balance compensation on a region-by-region basis. For each set of clustered pixels (corresponding to one illuminant) a new set of sensitivities to compensate the color shift due to the illuminant is determined, e.g. using the reciprocal of the ratios as weights in determining new sensitivities or using the spectral power distribution of estimated illuminant as a weight to calculate new sensitivities. A revised spatial mask is derived, wherein the magnitude of peaks and wavelength shifts of the sensitivity is related to particular values for the spatial mask by a look-up-table. The same parameters are ordinarily set for each cluster of pixels, perhaps varied by a pre-calibrated mask which compensates for pixel-to-pixel non-uniformities.

In the final capture stage, the revised spatial mask is applied to the imaging assembly, and an image of the scene is captured and recorded in a memory unit.

Figure 8:
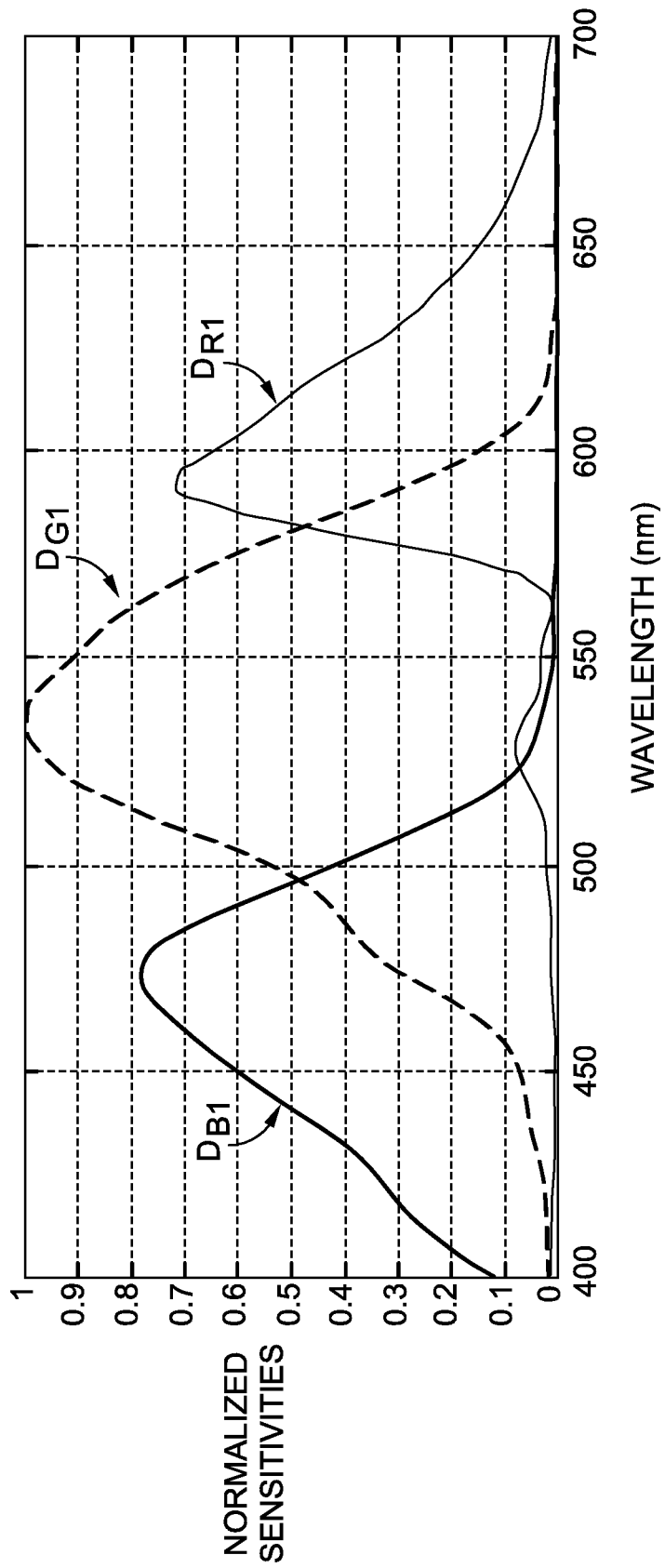
FIG. 8 is an example of a capture parameter for capturing a first image.

In more detail, a first capture of the scene is made with a first capture parameter. One such capture parameter is illustrated in FIG. 8, which shows capture parameters DR1, DG1 and DB1 which are applied uniformly in a spatial mask to all pixels of the image sensor 14 in the imaging assembly, so as to result in the spectral sensitivities shown in FIG. 8. These spectral sensitivities as shown in FIG. 8 may be represented by matrix $D_{\lambda\_RGB}$ with dimensions 3 (corresponding to 3 channels) by m, where m is the number of wavelength samples. For example, if the visible light range is sampled from 400 nm to 700 nm in intervals of 5 nm, m=61. For simplicity consider that the contribution from the optics is also included in the spectral sensitivities $D_{\lambda\_RGB}$.

Figure 9:
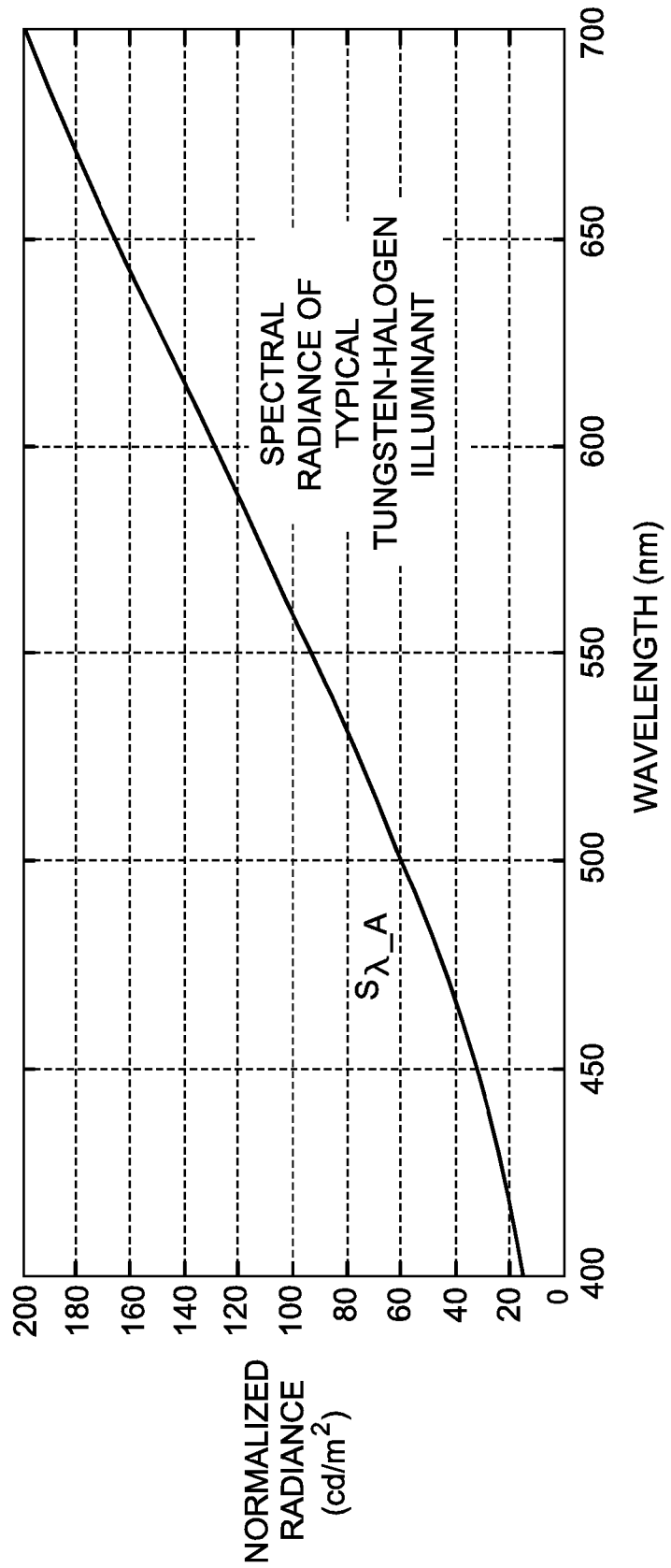
FIGS. 9 and 10 are views showing spectral radiance of a tungsten-halogen illuminant and a daylight illuminant, respectively.
Figure 10:
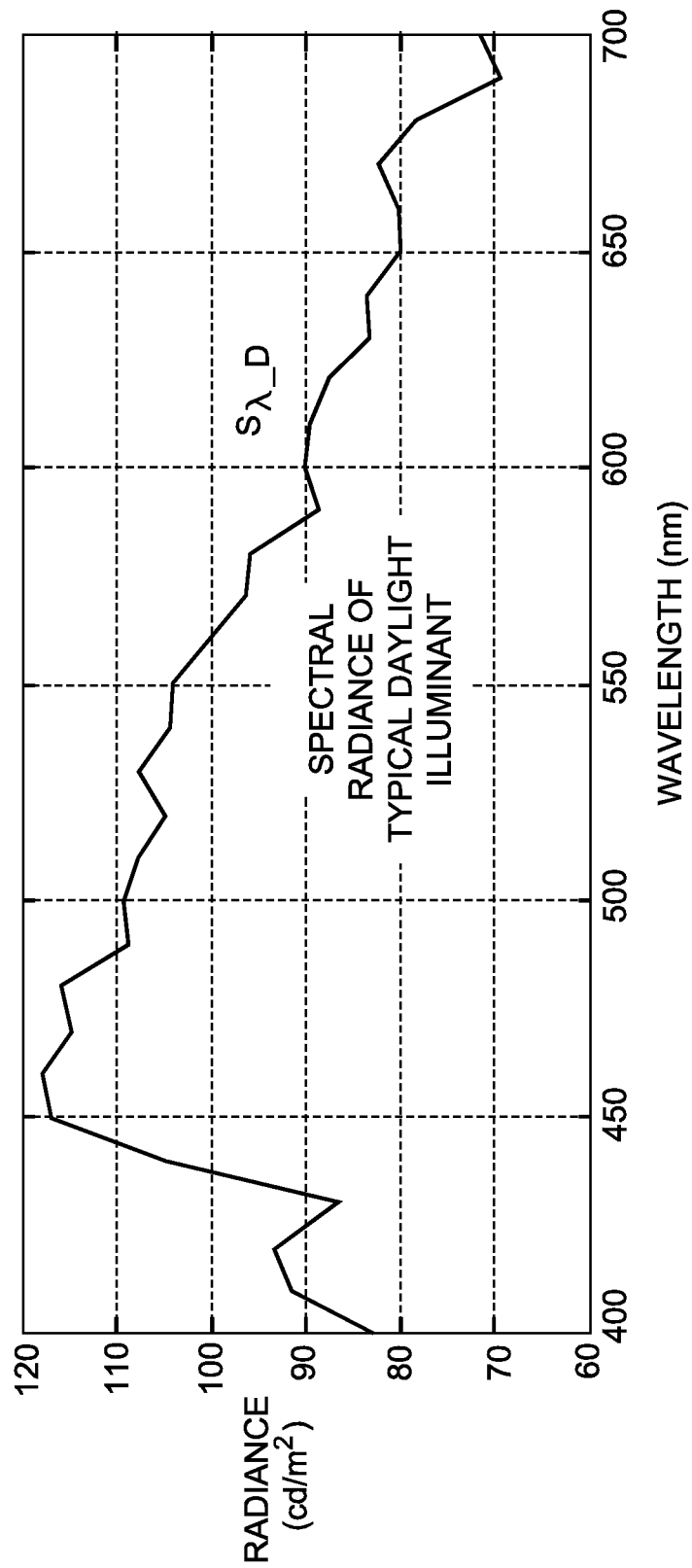

Consider the spectral power radiance of two illuminants: typical tungsten-halogen illumination represented by matrix $S_{\lambda\_A}$ shown in FIG. 9 and typical daylight illumination represented by matrix $S_{\lambda\_D}$ shown in FIG. 10. Matrices $S_{\lambda\_A}$ and $S_{\lambda\_D}$) have dimension 1 by m, where m is the number of wavelength samples.

Figure 11:
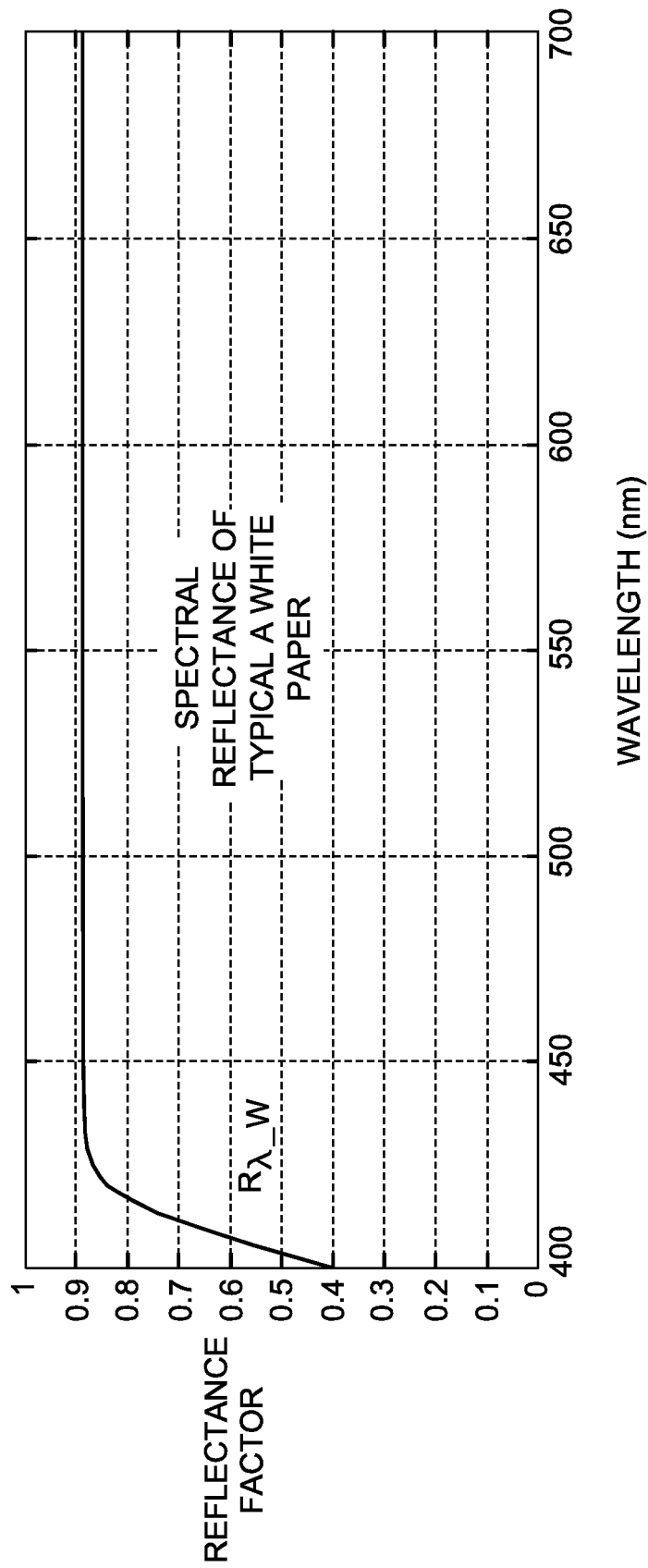
FIGS. 11 and 12 are views showing spectral reflectance of white paper and yellow paper, respectively.
Figure 12:
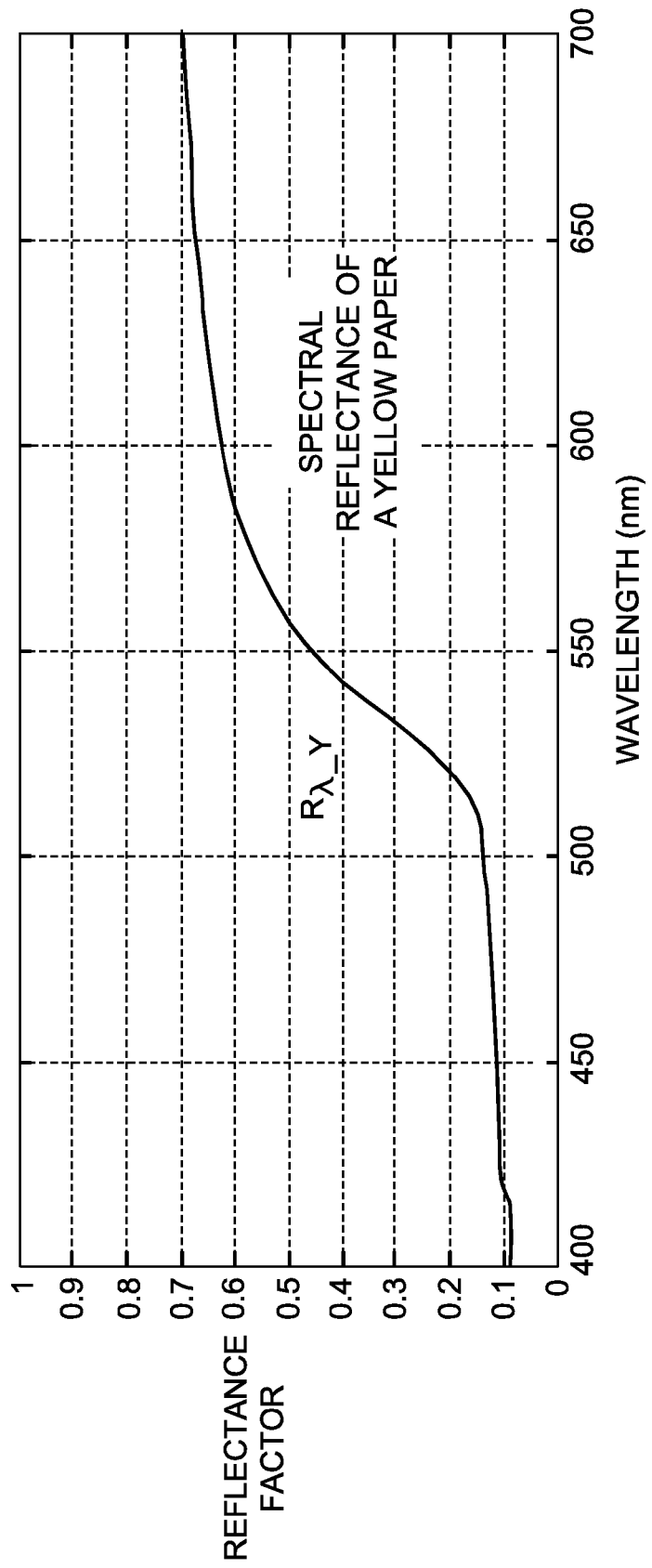

Now, consider the spectral reflectances of two materials: a white sheet of paper (without fluorescent material) represented by matrix $R_{\lambda\_W}$ as shown in FIG. 11 and a yellow sheet of paper represented by matrix $R_{\lambda\_Y}$ as shown in FIG. 12. Matrices $R_{\lambda\_W}$ and $R_{\lambda\_Y}$ have dimensions 1 by m, where m is the number of wavelength samples. When a digital camera with spectral sensitivities $D_{\lambda\_RGB}$ captures a yellow paper with spectral reflectance $R_{\lambda\_Y}$ illuminated by a daylight illuminant with spectral radiance $S_{\lambda\_D}$ the signals are integrated to produce three digital signals represented by the following equation:

$$C_{RGB\_D\_Y} = D_{\lambda\_RGB} * \text{diag}(S_{\lambda\_D}) * R^T_{\lambda\_Y} \qquad \text{Equation 1}$$

wherein $C_{RGB\_D\_Y}$ has dimensions 3 by 1, and where diag( ) denotes a diagonalized matrix and T denotes transposed matrix or vector.

Consider further when the same digital camera whose sensor is tuned to the same spectral sensitivities $D_{\lambda\_RGB}$ captures a white paper with spectral reflectance $R_{\lambda\_W}$ illuminated by a tungsten-halogen illuminant with spectral radiance $S_{\lambda\_A}$. As before, the signals are integrated to produce three digital signals represented by the following equation:

$$C_{RGB\_A\_W} = D_{\lambda\_RGB} * \text{diag}(S_{\lambda\_A}) * R^T_{\lambda\_W} \qquad \text{Equation 2}$$

wherein as before $C_{RGB\_A\_W}$ has dimensions 3 by 1, and diag( ) denotes a diagonalized matrix and T denotes transposed matrix or vector.

The two scenes captured as described above will have nearly identical values for pixels representing the two sheets of paper—yellow paper under daylight illumination in one case and white paper under tungsten-halogen in the other—as can be understood from the following, using examples of representative numerical values.

The red/green and red/blue ratios are calculated for both yellow paper under daylight and white paper under tungsten-halogen illuminant.

$$r/g\_D\_Y = C_{RGB\_D\_Y}(1)/C_{RGB\_D\_Y}(2) = 1.6 \qquad \text{Equation 3}$$

$$r/b\_D\_Y = C_{RGB\_D\_Y}(1)/C_{RGB\_D\_Y}(3) = 2.9 \qquad \text{Equation 4}$$

$$r/g\_A\_W = C_{RGB\_A\_W}(1)/C_{RGB\_A\_W}(2) = 1.6 \qquad \text{Equation 5}$$

$$r/b\_A\_W = C_{RGB\_A\_W}(1)/C_{RGB\_A\_W}(3) = 2.9 \qquad \text{Equation 6}$$

In these equations, the parenthesized indices (i.e., (1), (2) and (3)) respectively refer to the three outputs at each pixel of the image sensor, namely, the output of the red-like channel of the image sensor, the output of the green-like channel of the image sensor, and the output of the blue-like channel of the image sensor.

As a result, since r/g_D_Y=r/g_A_W and r/b_D_Y=r/b_A_W from the statistics of the scene it is not possible to unambiguously identify the correct illuminant to perform color balance.

In this example embodiment, which uses a digital camera with tunable spectral sensitivities that allows reading of three digital signals per pixel, when the shutter is half-pressed two pre-programmed voltage masks are sequentially applied. With the first voltage mask, the RGB channels of the sensor are set to spectral sensitivities shown in FIG. 8 and represented by $D_{\lambda\_RGB}$. The second voltage mask sets-up modified R'G'B'channels to the sensor with spectral sensitivities shown in FIG. 13 and represented by $D_{\lambda\_R'G'B'}$.

In this embodiment, the spectral sensitivities caused by $D_{\lambda\_R'G'B'}$, are blue-shifted relative to those caused by $D_{\lambda\_RGB}$. More generally, the first and second capture parameters are sufficiently different from each other so as to provide good discrimination for the imaging property of interest. For example, the first and second capture parameters may differ from each other such that first and second image data captured under a variety of different illuminants differs by more than a threshold value as between each different pair of illuminants. In some embodiments, as here, one set of capture parameters might cause a blue-shift in spectral sensitivity relative to the other set of capture parameters, which tends to provide good discrimination between the broad spectrum of a scene illuminated by daylight, the relatively red spectrum of a scene illuminated by a tungsten-halogen illuminant, and the relatively narrow-band spectra of illuminants such as fluorescent and sodium vapor illuminants, which tend to be narrow-band in the green area of the spectrum.

It should be recognized that the scene under consideration here is being used for purposes of explanation. As a consequence, the scene is a somewhat extreme example, namely, a scene which contains both yellow paper under white light and white paper under yellow light. For such a scene which contains such an extreme example, to obtain good discrimination between illuminants and between regions having similar and different illuminants, the first and second capture parameter differ greatly, as can be understood by comparison for FIG. 8 to FIG. 13. In many practical situations, however, such an extreme example of a scene is unlikely to be encountered often. Accordingly, in other embodiments, particularly those designed for application to somewhat more conventionally-encountered scenes, the differences between the first and second capture parameters might not necessarily be as large as those shown here.

When the yellow paper with spectral reflectance $R_{\lambda\_Y}$ is imaged by the sensor with spectral sensitivities $D_{\lambda\_R'G'B'}$, under daylight illuminant with spectral $S_{\lambda\_D}$, three digital signals are obtained as represented by the following equations $$C_{R'G'B'\_D\_Y} = D_{\lambda\_R'G'B'} * \mathrm{diag}(S_{\lambda\_D}) * R^T_{\lambda\_Y} \quad \text{Equation 7}$$

In the same way, when the white paper with spectral reflectance $R_{\lambda\_W}$ is imaged by the sensor with spectral sensitivities $D_{\lambda\_R'G'B'}$, under tungsten-halogen illuminant with $S_{\lambda\_A}$, three digital signals are obtained as represented by the following equation:

$$C_{R'G'B'\_A\_W} = D_{\lambda\_R'G'B'} * \mathrm{diag}(S_{\lambda\_A}) * R^T_{\lambda\_W} \quad \text{Equation 8}$$

The red/green and red/blue ratios are calculated for both yellow paper under daylight and white paper under tungsten-halogen illuminant, and yield the following, again using examples of representative numerical values:

$$r'/g'\_D\_Y = C_{R'G'B'\_D\_Y}(1)/C_{R'G'B'\_D\_Y}(2) = 0.9 \quad \text{Equation 9}$$

$$g'/b'\_D\_Y = C_{R'G'B'\_D\_Y}(2)/C_{R'G'B'\_D\_Y}(3) = 1.2 \quad \text{Equation 10}$$

$$r'/g'\_A\_W = C_{R'G'B'\_A\_W}(1)/C_{R'G'B'\_A\_W}(2) = 0.8 \quad \text{Equation 11}$$

$$g'/b'\_A\_W = C_{R'G'B'\_A\_W}(2)/C_{R'G'B'\_A\_W}(3) = 1.4 \quad \text{Equation 12}$$

A look-up-table with channel ratios r/g=1.6, r/b=2.9, r'/g'=0.9 and g'/b'=1.2 would indicate that there is high likelihood that the illuminant is daylight while r/g=1.6, r/b=2.9, r'/g'=0.8 and r'b'=1.4 would indicate that there is high likelihood that the illuminant is tungsten-halogen.

More precisely, as previously discussed, because the numerical results of Equations 3 and 4 are identical to those of Equations 5 and 6, it is not possible with a single capture using $D_{\lambda\_RGB}$ to unambiguously differentiate between a daylight illuminant on yellow paper and a tungsten-halogen illuminant on white paper. This single capture is thus unable to unambiguously identify the correct illuminant for this example of a scene. By comparison of the first capture with a second captured with a different capture parameter, however, it becomes possible to identify the illuminant. A suitable LUT might contain entries as follows:

TABLE 1

| LUT Entries | | | | |
| --- | --- | --- | --- | --- |
| Capture 1 | | Capture 2 | | |
| r/g | r/b | r/g | r/b | Illuminant |
| 1.6 | 2.9 | 0.9 | 1.2 | Daylight |
| 1.6 | 2.9 | 0.8 | 1.4 | Tungsten-Halogen |

This example illustrates a case in which the use of the imaging sensor with two captures of images with two different sets of tuned spectral sensitivities. In this case, the two captures with different capture parameters increased the degrees of freedom, providing more metrics that can unambiguously determine the type of illuminant, thereby increasing the robustness of the color balancing method. Once the illuminant is identified, the spectral sensitivities of the imaging assembly are tuned by determining an updated capture parameter, wherein the updated capture parameter compensates for the color cast provided by the illumination.

For example, for a color balanced scene, r/g and r/b should be close to one for a gray or white (neutral) color. The new spectral sensitivities to be tuned $D_{\lambda\_New}$ are selected in order to produce this response. Considering that the illuminant is tungsten-halogen, in matrix notation there are now two equations as follows:

$$D_{\lambda\_New}(1,:) * \mathrm{diag}(S_{\lambda\_A}) * R^T_{\lambda\_W} = D_{\lambda\_New}(2,:) * \mathrm{diag}(S_{\lambda\_A}) * R^T_{\lambda\_W} \quad \text{Equation 13}$$

$$D_{\lambda\_New}(1,:) * \mathrm{diag}(S_{\lambda\_A}) * R^T_{\lambda\_W} = D_{\lambda\_New}(3,:) * \mathrm{diag}(S_{\lambda\_A}) * R^T_{\lambda\_W} \quad \text{Equation 14}$$

Since there are multiple unknowns (3×m) and only two equations the system is an undetermined system that has multiple possible solutions. However, it is necessary to impose smoothness, continuity constraints and consider a set of spectral sensitivities curves that is within the range of sensor spectral tunability. There are several numerical methods to find a suitable spectral sensitivity with these constraints. There is a limited possibility for types of illumination and a look-up-table can easily be generated giving the color sensitivities necessary for color balancing for each illuminant.

On the other hand, it is also possible to come up with a simple estimation procedure by using the reciprocal of r/g and r/b ratios as weights to generate new spectral sensitivities based on $D_{\lambda\_RGB}$ sensitivities.

For the example above, after identifying the illuminant, a new capture parameter is derived for good color balance and to avoid color cast. One possible spectral sensitivity $D_{\lambda\_New}$ that eliminates the color cast is given by the spectral sensitivities shown in FIG. 14. An electronic mask is generated with voltages that produce the spectral sensitivities shown in FIG. 14, as pre-determined by calibration and the image is captured when shutter is pressed and saved in a memory unit. Using reasoning similar to that explained above, digital signals are obtained by using the spectral sensitivity $D_{\lambda\_New}$, as follows:

$$C_{RGB\_New\_A\_W} = D_{\lambda\_New} * \text{diag}(S_{\lambda\_A}) * R^T_{\lambda\_W} \qquad \text{Equation 15}$$

When the r/g and r/b ratios are calculated with the digital signals obtained, it is observed that r/g=r/b=1 for the white neutral region, thus proving the effectiveness of the color balance.

In another embodiment the detection of region of multiple illuminants by analyzing r/g, r/b, r'/g' and r'/b' ratios is considered. Based on the illuminant detected for each region, color sensitivity compensation is used for each illuminated region with difference correlated temperature and the color compensations are transcribed as the voltages for each region in the spatial electrical mask that will be applied to the tunable sensitivity imaging sensor during capture of the scene. In this embodiment, each region that has illuminant with distinct correlated color temperature will be compensated in one single shot.

Some scenes have multiple regions each illuminated by a different illuminant. In such a situation, embodiments herein expand the concept of global ratio values to regions of ratio values in which when a wide range of objects with distinct spectral reflectances are imaged by the sensor under a specific illumination the ratios can be clustered in one region. This region of clustered ratios will be distinct to same objects illuminated by a different illuminant using the same sensor. By determining ratios (by calculating the ratios of every pixel or by sampling spatially ratios of an image) it is possible to estimate the illuminant by looking into which cluster of ratios the sample belongs.

Consider an example described in the Summary herein, wherein a scene has different illuminants in the left and right halves, such as a scene in whose left half a yellow paper is illuminated by daylight illuminant with blue color cast while in its right half a white paper is illuminated by halogen lamp with a yellow cast. For this example, a first image is captured using first capture parameters shown in FIG. 8 (i.e., $D_{\lambda\_RGB}$), and a second image is captured using second capture parameters shown in FIG. 13 (i.e., $D_{\lambda\_R'G'B'}$).

For the first capture parameters of $D_{\lambda\_RGB}$, the ratios of a gray background (signified by G) surrounding the yellow paper (Y) under daylight illumination (D) in the left hand side, and the ratios of a darker background (signified by K) surrounding the white paper (W) illuminated by tungsten/halogen lamp (A), are computed from measurements in the same fashion as performed for the yellow and white papers. Using examples of representative numerical values, the resulting ratios for the gray surround under daylight illumination are shown in the equations below. In these equations, GY refers to the gray background surrounding the yellow paper under daylight illumination D, and GK refers to the darker background surrounding the white paper illuminated by tungsten/halogen lamp A:

$$r/g\_D\_GY = C_{RGB\_D\_GY}(1)/C_{RGB\_D\_GY}(2) = 0.8 \qquad \text{Equation 16}$$

$$r/b\_D\_GY = C_{RGB\_D\_GY}(1)/C_{RGB\_D\_GY}(3) = 0.8 \qquad \text{Equation 17}$$

On the other hand, again using examples of representative numerical values, the resulting ratios for the gray surround under tungsten/halogen illumination are:

$$r/g\_A\_GK = C_{RGB\_A\_GK}(1)/C_{RGB\_A\_GK}(2) = 2.6 \qquad \text{Equation 18}$$

$$r/b\_A\_GK = C_{RGB\_A\_GK}(1)/C_{RGB\_A\_GK}(3) = 5.4 \qquad \text{Equation 19}$$

For the second capture parameters of $D_{\lambda\_R'G'B'}$, for the gray surround under daylight illumination, the ratios of r'/g' and g'/b' are:

$$r'/g'\_D\_GY = C_{R'G'B'\_D\_GY}(1)/C_{R'G'B'\_D\_GY}(2) = 0.8 \qquad \text{Equation 20}$$

$$g'/b'\_D\_GY = C_{R'G'B'\_D\_GY}(2)/C_{R'G'B'\_D\_GY}(3) = 0.9 \qquad \text{Equation 21}$$

For the darker surround under tungsten-halogen illumination, the ratios are:

$$r'/g'\_A\_GK = C_{R'G'B'\_A\_GK}(1)/C_{R'G'B'\_A\_GK}(2) = 0.6 \qquad \text{Equation 22}$$

$$g'/b'\_A\_GK = C_{R'G'B'\_A\_GK}(2)/C_{R'G'B'\_A\_GK}(3) = 1.3 \qquad \text{Equation 23}$$

Figure 15:
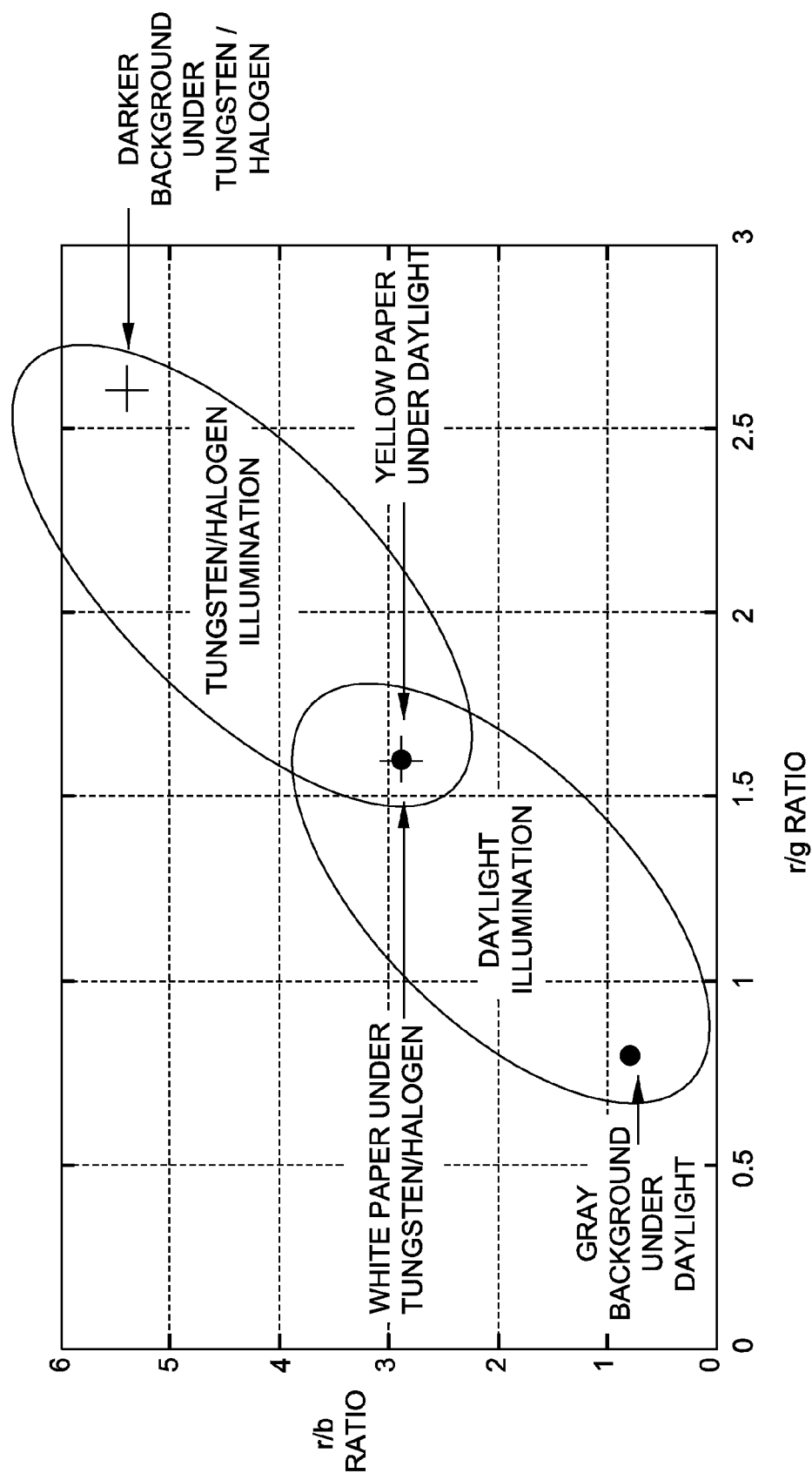
FIGS. 15 and 16 are views for explaining numerical examples which differentiate between illuminants and between regions having different illuminants.

FIG. 15 shows a plot of r/g by r/b ratios for the four objects (white paper under tungsten/halogen from Equations 5 and 6; gray background under daylight from Equations 16 and 17; yellow paper under daylight from Equations 3 and 4; and darker background under tungsten/halogen from Equations 18 and 19) using the first capture parameters $D_{\lambda\_RGB}$ whose spectral sensitivity is represented in FIG. 8. Note that the white r/b and r/g values coincide for both white paper under tungsten/halogen and yellow paper under daylight. The bluish nature of daylight illuminant and the relative low red content of this illuminant produce relatively low r/b and r/g ratios compared to a tungsten/halogen illumination that has lots of energy in the red region of the spectra and not much in the blue region of the spectra as illustrated in FIG. 15. There is an area of overlap in which it is undistinguishable which is the illuminant because of the overlap between the ellipses representing the clusters of [r/g r/b] pairs for each illumination.

Figure 13:
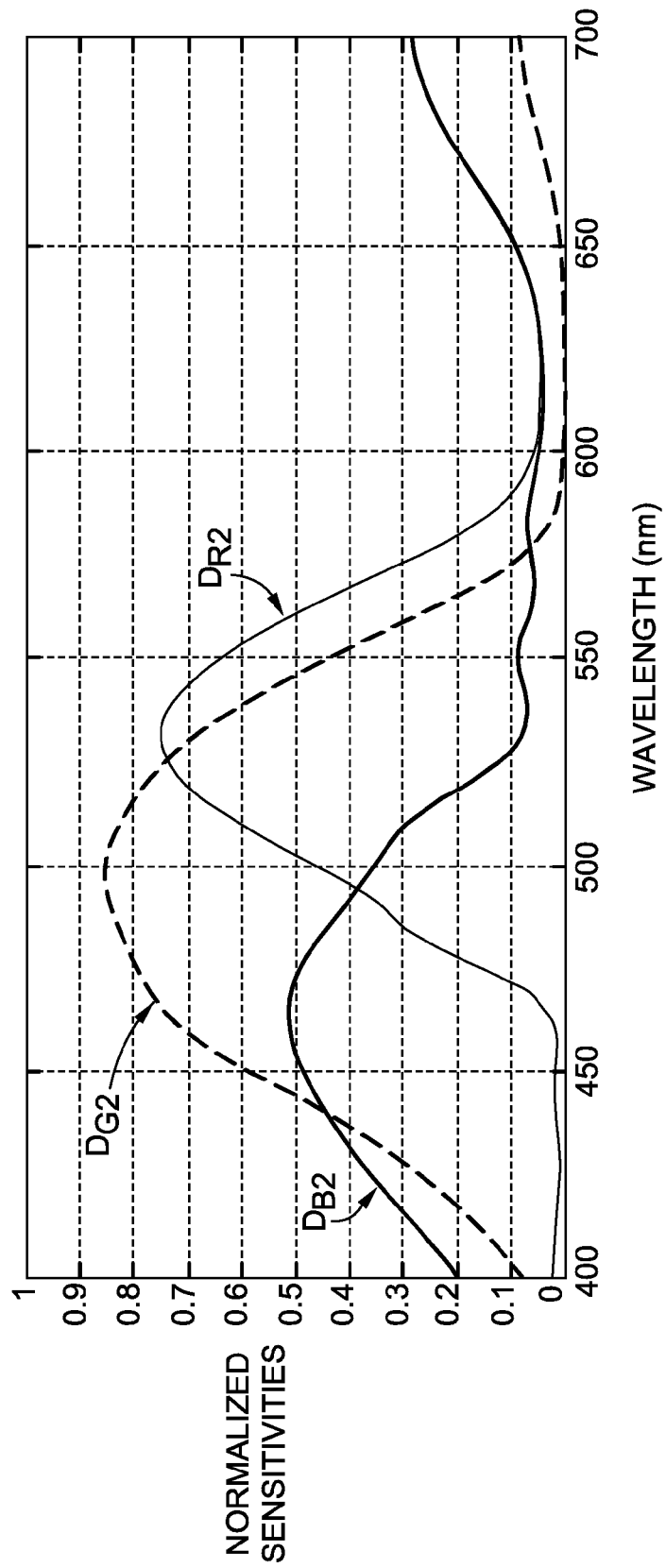
FIG. 13 is an example of a second capture parameter for capturing a second image.
Figure 14:
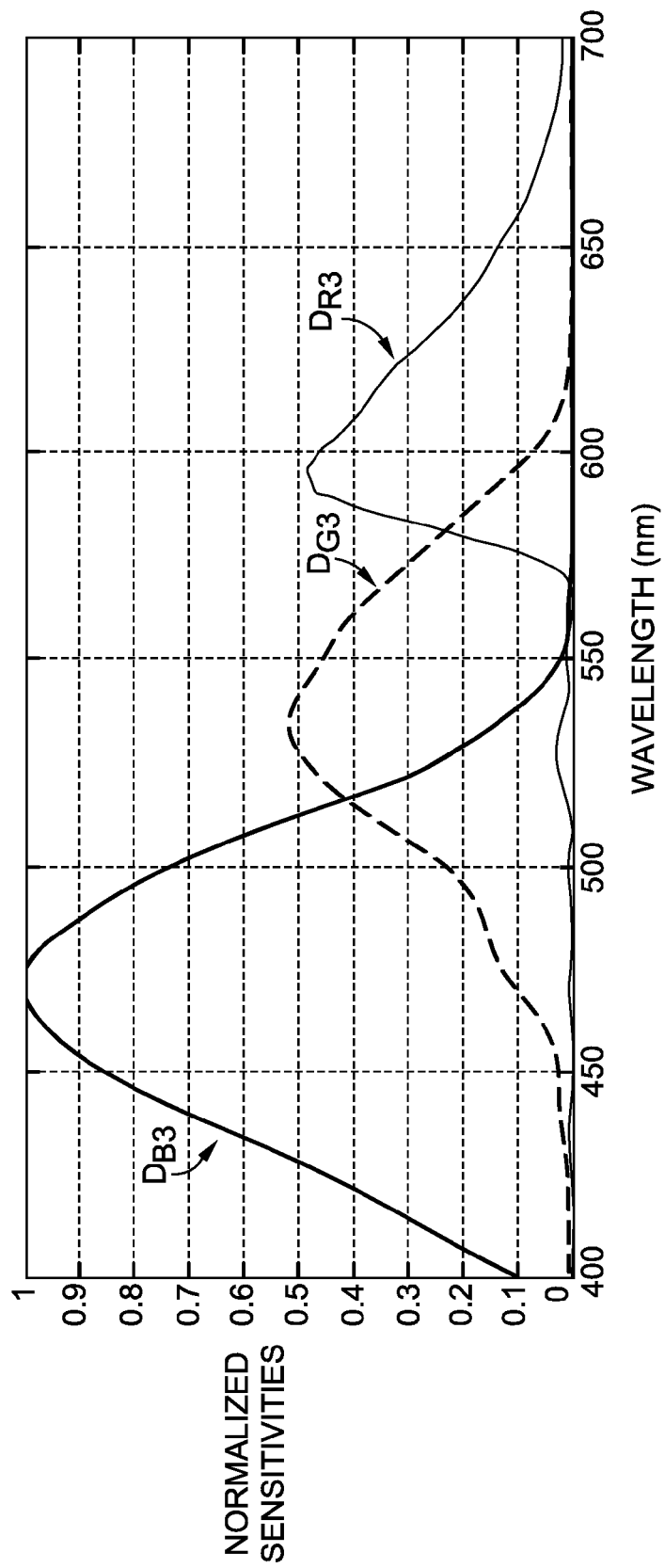
FIG. 14 is a view showing a third capture parameter derived in accordance with an illuminant identified for a scene.
Figure 16:
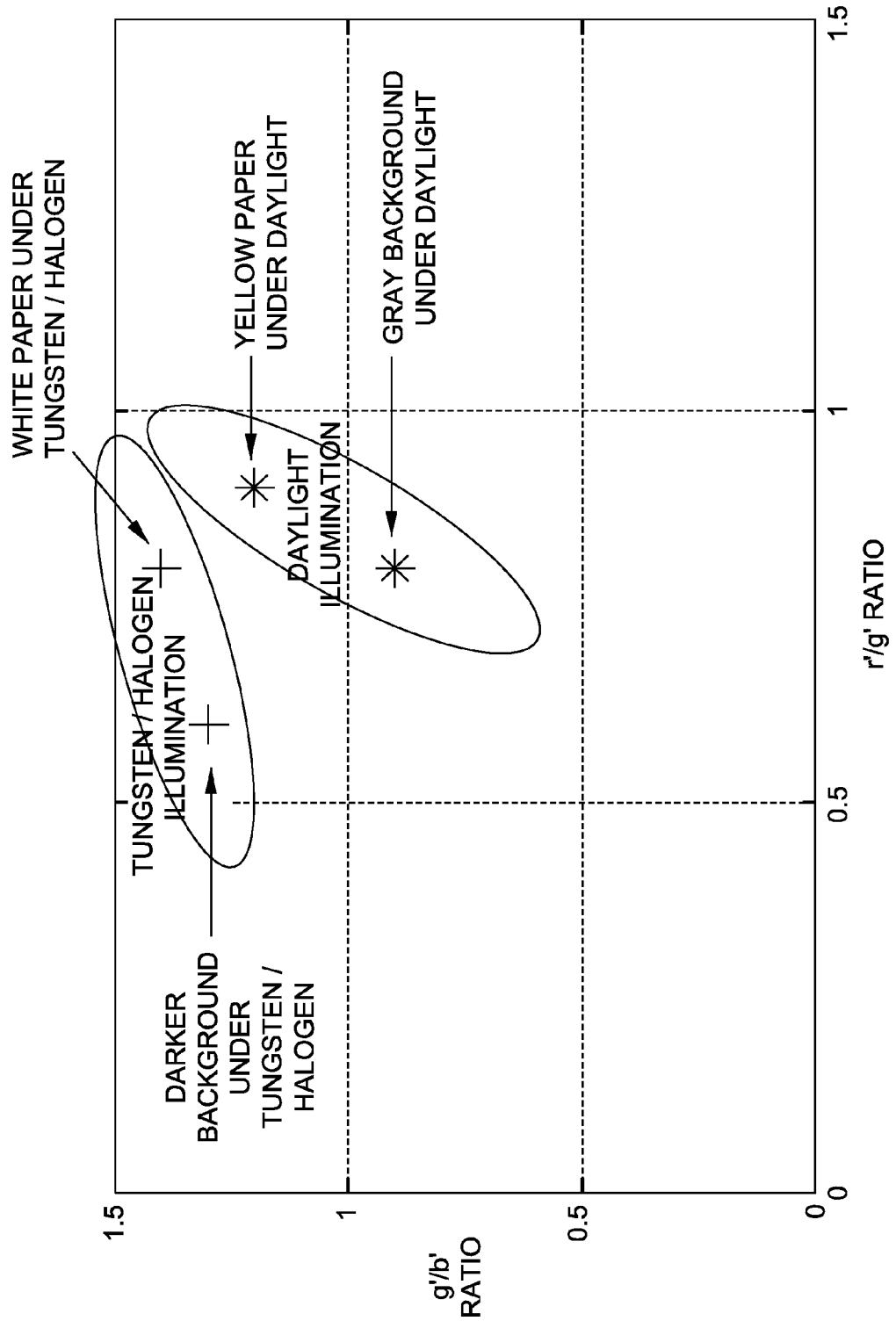

FIG. 16 shows a plot of r'/g' by g'/b' ratios for the four objects (white paper under tungsten/halogen from Equations 11 and 12; gray background under daylight from Equations 20 and 21; yellow paper under daylight from Equations 9 and 10; and darker background under tungsten/halogen from Equations 22 and 23) using second capture parameters $D_{\lambda\_R'G'B'}$ whose spectral sensitivity is shown in FIG. 13. In this graphical representation there is no overlap between ratios for both illuminants resulting in a more unequivocal estimation of illumination.

Moreover, because of the clustering which is evident from these comparisons of first and second captures, it is also apparent that the regions of the image can be distinguished, as between first and second regions illuminated by respectively different illuminants. Thus, in the case of the scene under consideration in this example, it becomes possible to identify a first region on the left half which is illuminated by daylight illuminant, and a second region on the right half illuminated by a tungsten-halogen illuminant.

In the embodiments described herein, the tunable imaging assembly may tunable such that each pixel or each region of multiple pixels is tunable individually, such that the spectral responsivity of each pixel or region of pixels is tunable independently of the spectral responsivity of other pixels or regions of pixels. In some example embodiments, the entirety of the imaging assembly may be tuned to the same spectral responsivity, such that substantially all pixels and substantially all regions of pixels are tuned to substantially the same spectral responsivity. Such an arrangement might be advantageous in situations where a single imaging property is applicable to nearly the entirety of the scene, such as a single white balance or a single dynamic range.

To assist in a greater understanding of the disclosure, a brief summary and some further examples are provided here for the analysis stage.

In the analysis stage, objects in a scene are decoupled from their illumination. This is generally difficult because of the inherent ambiguity of captured information. For example, there is need to know if the captured object in the scene is actually yellow or if it is a white object under yellowish light. Human visual system automatically compensates by equalizing color bias in lighting by performing an adaptation based on physiological responses in the visual system combined with cognitive information (for example, a human being knows that a red object with an apple shape is probably red, and is not merely a white object under red light). However, imaging sensors do not perform this compensation automatically. There is a need to perform some image analysis in order to identify the illumination (illumination estimation) and once the illumination estimation takes place it is possible to compensate the color channels of the image in order to produce a more color balanced scene.

Conventional cameras are usually limited in their ability for extensive image analysis by a number of factors, including a global compensation, a limited number of fixed color channels, and a lack of flexibility. By way of explanation, because of global compensation, wherein all pixels are compensated the same, a global correction by these algorithms can only address one illumination in the scene. Because of a limited number of fixed color channels, wherein most color imaging sensors are based on the traditional red-green-blue Bayer pattern, it is an ill-posed inverse problem to estimate the illumination using only three fixed spatial color sensors. Because of lack of flexibility, imaging under illumination with a strong color saturation will typically saturate the signals in one or more color channels. For example, imaging under an incandescent lamp may saturate the red color signal. As a result, an inaccurate analysis will ensue with an incorrect estimation of illuminant. Even if the illuminant is accurately estimated the saturated signals will lead to incorrect color balancing.

According to embodiments described herein, the analysis stage can be approached using a strategy of sequential adaptive filtering. In this approach the array of tunable filter sensors receives a sequence of pre-programmed capture parameters that adjusts the color filters of all pixels with same values. For each voltage mask an image is captured. If n images are captured, n values are provided for each pixel, wherein each of the n values has a red-like channel, a green-like channel and a blue-like channel. The imaging system may be pre-calibrated by capturing known color targets under a variety of pre-determined illumination and a multi-dimensional look-up-table may be generated to map captured digital values (for each filter adjustment) to particular illuminants. The multi-dimensional look-up-table is then used to estimate the illumination for each pixel of the image.

In one typical arrangement, the illumination will be described in terms of correlated-color-temperature (CCT). For example, a very reddish horizontal sunlight illumination typical of sunsets will have a CCT of 2,000 K. An incandescent light bulb will have a CCT of 2,900 K. Natural daylight will depend on atmospheric conditions but it will be in the range of CCTs 4,500K to 6,500 K. Artificial daylight simulation lamps are also in the same range of CCTs as natural daylight. Very dark blue skies after sunset produce a very high CCT (10,000 to 20,000 K). Typically, white balance adjusts colors to correspond to a look under daylight illumination. Therefore if the illumination is 3,000 K the system might apply a bias of +2,500 K to compensate to a preset value of 5,500 K. If the illumination is 10,000 K, the system might apply a bias of −4,500 K to a preset value of 5,500 K.

If one channel or more channels are saturated the analysis process is repeated with new color filter adjustments.

In the capture stage of image enhancement mode the main purpose is to automatically enhance the image based on analysis of the scene (in this example white balance) and perform pixel-based adjustments.

The calculated bias spatial mask given by the analysis stage may be converted to a voltage mask of voltages for application to control electrodes of the image sensor using a pre-calculated look-up-table (based on calibration) to apply the correct voltages for the tunable filter of each pixel, and an image superior in white balance is captured.

A high-level summary of embodiments described herein thus proceeds as follows:

Step 1. Capture sequence of images with pre-set color filters in the tunable filter imaging sensor Step 2. Analyze if there are no saturated channels and if yes, select new filters and go to step 1.

Step 3. Compute illumination estimation for each pixel in the image by using the multi-dimensional look-up table Step 4. Compute CCT bias based on estimated illumination and pre-set CCT for white balance correction producing spatial CCT-bias mask Step 5. Compute spatial voltage mask based on a pre-calculated conversion look-up-table from CCT bias values to voltages Step 6. Apply spatial voltage mask to tune filters and capture images.

Figure 17:
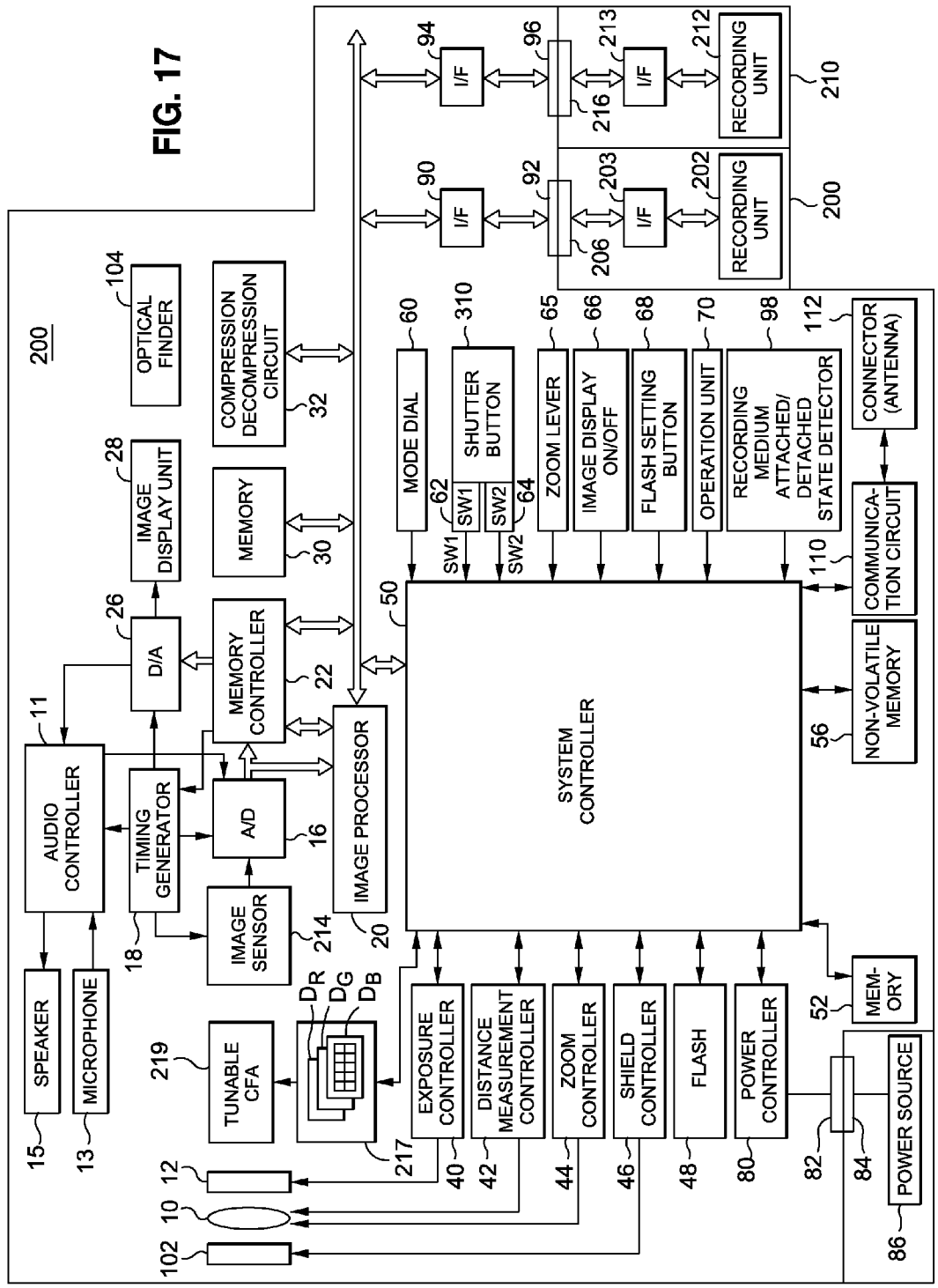
FIG. 17 is a block diagram showing an example embodiment of a digital camera.
Figure 18:
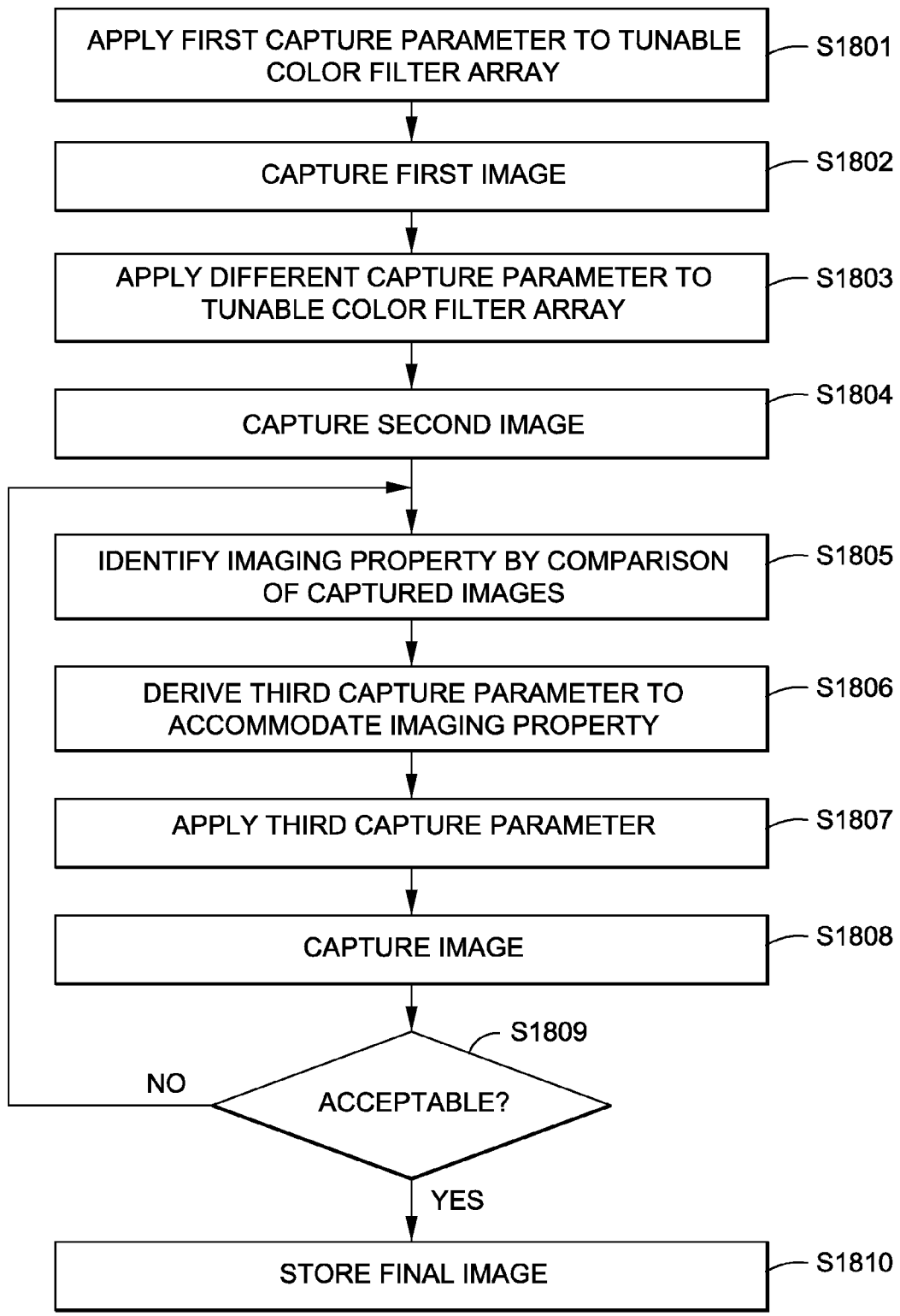
FIG. 18 is a flow diagram for explaining an example embodiment of automatic determination of an imaging property for a scene.

<FIGS. 17 and 18>

FIG. 17 is a block diagram showing another example embodiment of an arrangement of a digital camera 200. In the embodiment of FIG. 17, parts and features that are largely similar to those of the example embodiment of FIG. 1 are illustrated with like reference numerals, and a detailed explanation thereof is omitted in the interest of brevity.

One way that the embodiment of FIG. 17 differs from the embodiment of FIG. 1 concerns the construction of the tunable imaging assembly. In the embodiment of FIG. 1, the tunable imaging assembly includes tunable image sensor 14, perhaps in combination with optics such as lens 10. Because the image sensor 14 in the embodiment of FIG. 1 itself has a tunable spectral response, it is customary to omit a preceding color filter array, since the inclusion of any filter necessarily would decrease the signal-to-noise ratio by filtering the amount of light incident on image sensor 14.

In contrast, in the embodiment of FIG. 17, the spectral responsivity of image sensor 214 is not necessarily tunable, but rather the spectral responsivity of a preceding color filter array 219 is. Thus, in the example embodiment of FIG. 17, the tunable imaging assembly includes tunable color filter array (CFA) 219 and image sensor 214, perhaps in combination with optics such as lens 10. In the embodiment of FIG. 17, image sensor 214 is not necessarily tunable, although in other embodiments it might be.

Turning more specifically to the embodiment of FIG. 17, a light beam (light beam incident upon the angle of view of the lens) from an object in a scene that goes through the optical system (image sensing lens) 10 passes through an opening of a shutter 12 having a diaphragm function, is filtered by tunable color filter array 219, and forms an optical image of the object on the image sensing surface of image sensor 214. The image sensor 214 converts the optical image to analog image signals and outputs the signals to an A/D converter 16. The A/D converter 16 converts the analog image signal to digital image signals (image data).

In FIG. 17, an imaging assembly is comprised of tunable color filter array 219 and image sensor 214 together with associated optics, such that in some embodiments the imaging assembly is comprised of image sensor 214 preceded by color filter array 219 and lens 10.

Tunable color filter array 219 may be a spatial color filter array, such as a color filter array having a spatial distribution of a repeating pattern of filter elements. In this case, image data output from image sensor 214 is demosaiced, so as to result in output of a red-like channel for each pixel, a green-like channel for each pixel, and a blue-light channel for each pixel. Alternatively, tunable color filter array 219 might be a temporal color filter array, in which case the color filter quickly and sequentially changes spectral responsivity, with image data collected by image sensor 214 after each change. In this case, the sequential outputs of image sensor 214 are collected so as to result in output signals for each pixel for a red-like channel, a green-like channel, and a blue-light channel.

The spectral responsivity of tunable color filter array 219 is tunable in accordance with a capture parameter 217. In this embodiment, capture parameter 217 may be comprised of multiple spatial masks, with one mask for each channel of information output by image sensor 214, namely, the aforementioned red-like channel, green-like channel, and blue-light channel. Thus, in this example where image sensor 214 outputs three or more channels, capture parameters 217 include a spatial mask DR for the red-like channel of information, a spatial mask DG for the green-like channel of information, and a spatial mask DB for the blue-light channel of information. Each spatial mask comprises an array of control parameters applied to the tunable color filter array 219 in correspondence to pixels or regions of pixels in image sensor 214. The resulting spectral responsivity of each pixel, or each region of plural pixels, is thus tunable individually and independently of other pixels or regions of pixels, by virtue of the capture parameter 217 imposed on tunable color filter array 219.

Tunable color filter array 219 may be comprised of a tunable color filter array as described in U.S. Pat. No. 6,466,961 by Miller, mentioned hereinabove. Spatial masks DR, DG and DB may correspond to voltage biases applied to control electrodes of the tunable color filter array 219.

FIG. 18 is a flow diagram for explaining operation of this example embodiment. The process steps shown in FIG. 18 are computer-executable process steps executed primarily by system controller 50 based on computer-executable process steps stored in a computer-readable memory medium such as non-volatile memory 56.

Briefly, according to FIG. 18, an imaging property for a scene is identified, such as a color balance property or a high-dynamic range property. Two images of the scene are captured with two different sets of capture parameters which tune the spectral responsivity of an imaging assembly such as an imaging assembly which includes a tunable color filter array which precedes an image sensor. The capture parameters may be applied, and the two images of the scene captured, when a shutter is half-pressed. The two sets of capture parameters may be pre-designated, and the differences between them are designed to provide good discrimination for the imaging property. The imaging property for the scene is identified based on a comparison of the two images. The imaging property may be identified individually for different regions of the scene, in which case the two captured images may be divided into plural regions based on statistics of the images. Based on the imaging property (or properties) thus identified, a third capture parameter may be derived, wherein the third capture parameter is designed for capture of the scene with accuracy for the identified imaging property. The third capture parameter is applied to the tunable imaging assembly, such as by application to a tunable color filter array that precedes an image sensor, and a final image of the scene is captured, such as when a shutter is fully pressed.

In more detail, in step S1801, a first capture parameter is applied to tunable color filter array 219. The first capture parameter may be a pre-designated capture parameter stored in non-volatile memory 56. In this example embodiment, the capture parameter may be a spatial mask which individually tunes each pixel or each region of plural pixels in tunable color filter array 219, such as by application of spatial masks DR, DG and DB.

Following application of the first capture parameter to tunable color filter array 219, a first image is captured in step S1802. Thereafter, a different capture parameter is applied to tunable color filter array 219, and a second image is captured (steps S1803 and S1804). The second capture parameter may likewise be a pre-designated capture parameter stored in non-volatile memory 56. The second capture parameter is different from the first capture parameter, and the differences are designed to provide good discrimination for the imaging property being identified.

As one example, the imaging property being identified might be the illuminant or illuminants for different regions in the scene. In such a situation, the first and second capture parameters are different so as to provide good discrimination between differing illuminants. For example, the first and second capture parameters may differ from each other such that first and second image data captured under a variety of different illuminants differs by more than a threshold value as between each different pair of illuminants. In some embodiments, as here, one set of capture parameters might cause a blue-shift in spectral sensitivity relative to the other set of capture parameters, which tends to provide good discrimination between the broad spectrum of a scene illuminated by daylight, the relatively red spectrum of a scene illuminated by a tungsten-halogen illuminant, and the relatively narrow-band spectra of illuminants such as fluorescent and sodium vapor illuminants, which tend to be narrow-band in the green area of the spectrum.

After capture of the first and second images, step S1805 identifies the imaging property by comparison thereof. Such a comparison, and the resulting identification of the imaging property, might proceed in ways largely similar to those described above.

Step S1806 derive a third capture parameter which accommodates the imaging property. For example, and as described above in connection with other embodiments, the imaging property of interest might be the illuminant or illuminants for the scene. In such a situation, the third capture parameter is derived so as to accommodate the precise nature of the illuminant or illuminants identified in step S1805. Likewise, and as also described above in connection with other embodiments, the imaging property of image might be the dynamic range for the scene. In such a case, the third capture parameter is derived so as to accommodate the dynamic range identified for the scene.

Steps S1807 and S1808 apply the third capture parameter to the tunable color filter array 219, and capture an additional image. If the image is acceptable in step S1809, then a final image is stored in step S1810. On the other hand, if the image is deemed not acceptable in step S1809, then a further iteration of the procedure is performed, by returning to step S1805.

Acceptability of the image in step S1809 may be performed automatically by system controller 50 based on predesignated tolerances. In other embodiments, acceptability of the image in step S1809 might be determined by the user.

In the embodiments described herein, the tunable color filter array may tunable such that each pixel or each region of multiple pixels is tunable individually, such that the spectral responsivity of each pixel or region of pixels is tunable independently of the spectral responsivity of other pixels or regions of pixels. In some example embodiments, the entirety of the color filter array may be tuned to the same spectral responsivity, such that substantially all pixels and substantially all regions of pixels are tuned to substantially the same spectral responsivity. Such an arrangement might be advantageous in situations where a single imaging property is applicable to nearly the entirety of the scene, such as a single white balance or a single dynamic range.

Other Embodiments

According to other embodiments contemplated by the present disclosure, example embodiments may include a computer processor such as a single core or multi-core central processing unit (CPU) or micro-processing unit (MPU), which is constructed to realize the functionality described above. The computer processor might be incorporated in a stand-alone apparatus or in a multi-component apparatus, or might comprise multiple computer processors which are constructed to work together to realize such functionality. The computer processor or processors execute a computer-executable program (sometimes referred to as computer-executable instructions or computer-executable code) to perform some or all of the above-described functions. The computer-executable program may be pre-stored in the computer processor(s), or the computer processor(s) may be functionally connected for access to a non-transitory computer-readable storage medium on which the computer-executable program or program steps are stored. For these purposes, access to the non-transitory computer-readable storage medium may be a local access such as by access via a local memory bus structure, or may be a remote access such as by access via a wired or wireless network or Internet. The computer processor(s) may thereafter be operated to execute the computer-executable program or program steps to perform functions of the above-described embodiments.

According to still further embodiments contemplated by the present disclosure, example embodiments may include methods in which the functionality described above is performed by a computer processor such as a single core or multi-core central processing unit (CPU) or micro-processing unit (MPU). As explained above, the computer processor might be incorporated in a stand-alone apparatus or in a multi-component apparatus, or might comprise multiple computer processors which work together to perform such functionality. The computer processor or processors execute a computer-executable program (sometimes referred to as computer-executable instructions or computer-executable code) to perform some or all of the above-described functions. The computer-executable program may be pre-stored in the computer processor(s), or the computer processor(s) may be functionally connected for access to a non-transitory computer-readable storage medium on which the computer-executable program or program steps are stored. Access to the non-transitory computer-readable storage medium may form part of the method of the embodiment. For these purposes, access to the non-transitory computer-readable storage medium may be a local access such as by access via a local memory bus structure, or may be a remote access such as by access via a wired or wireless network or Internet. The computer processor(s) is/are thereafter operated to execute the computer-executable program or program steps to perform functions of the above-described embodiments.

The non-transitory computer-readable storage medium on which a computer-executable program or program steps are stored may be any of a wide variety of tangible storage devices which are constructed to retrievably store data, including, for example, any of a flexible disk (floppy disk), a hard disk, an optical disk, a magneto-optical disk, a compact disc (CD), a digital versatile disc (DVD), micro-drive, a read only memory (ROM), random access memory (RAM), erasable programmable read only memory (EPROM), electrically erasable programmable read only memory (EEPROM), dynamic random access memory (DRAM), video RAM (VRAM), a magnetic tape or card, optical card, nanosystem, molecular memory integrated circuit, redundant array of independent disks (RAID), a nonvolatile memory card, a flash memory device, a storage of distributed computing systems and the like. The storage medium may be a function expansion unit removably inserted in and/or remotely accessed by the apparatus or system for use with the computer processor(s).

This disclosure has provided a detailed description with respect to particular representative embodiments. It is understood that the scope of the appended claims is not limited to the above-described embodiments and that various changes and modifications may be made without departing from the scope of the claims.

What is claimed is:

1. A method for identifying an imaging property for a scene by using an imaging assembly which has a spectral response which is tunable in accordance with a capture parameter, the method comprising:
    applying a first capture parameter to the imaging assembly, and capturing a first image of the scene using the imaging assembly whose spectral response is tuned in accordance with the first capture parameter;
    applying a second capture parameter to the imaging assembly, wherein the second capture parameter is different from the first capture parameter, and capturing a second image of the scene using the imaging assembly whose spectral response is tuned in accordance with the second capture parameter; and
    identifying an illuminant for the scene based on at least one color channel ratio of the first image of the scene and at least one color channel ratio of the second image of the scene, wherein the illuminant has a defined spectral power distribution.

2. The method according to claim 1, wherein in said identifying step, the first and second images are compared to identify multiple regions of the scene having a similar illuminant.

3. The method according to claim 1, wherein in said identifying step, the first and second images are compared to identify multiple regions in the scene having illuminants that differ from one another.

4. The method according to claim 1, wherein the first and second capture parameters are sufficiently different from each other so as to provide good discrimination for the illuminant.

5. The method according to claim 1, wherein one of the first and second capture parameters causes a blue-shift in spectral sensitivity relative to the other of the first and second capture parameters.

6. The method according to claim 1, wherein the imaging assembly provides three or more channels of information for each pixel of the scene, including a red-like channel, a blue-like channel and a green-like channel, and wherein in said comparing step, the first and second images of the scene are compared by using ratios of the three color channels.

7. The method according to claim 1, wherein the imaging assembly comprises an image sensor which has a tunable spectral response.

8. The method according to claim 1, wherein the imaging assembly comprises an image sensor and a preceding color filter array which has a tunable spectral response.

9. A method for adjusting white balance of an image capture device which includes an imaging assembly having a spectral response which is tunable in accordance with a capture parameter, the method comprising:
   applying a first capture parameter to the imaging assembly;
   capturing a first image of the scene using the imaging assembly whose spectral response is tuned in accordance with the first capture parameter;
   applying a second capture parameter to the imaging assembly, wherein the second capture parameter is different from the first capture parameter;
   capturing a second image of the scene by using the imaging assembly whose spectral response is tuned in accordance with the second capture parameter;
   determining an illuminant for the scene based on at least one color channel ratio of the first image and at least one color channel ratio of the second image of the scene, wherein the illuminant has a defined spectral power distribution;
   deriving a third capture parameter based on the defined spectral power distribution of the illuminant, wherein the third capture parameter is derived so as to obtain white balance in accordance with the defined spectral power distribution of the illuminant.

10. The method according to claim 9, wherein in said determining step, the first and second images are compared to identify multiple regions of the scene having a similar illuminant, and wherein the third capture parameter is applied to the imaging assembly for all of such multiple regions.

11. The method according to claim 9, wherein in said determining step, the first and second images are compared to identify multiple regions in the scene having illuminants that differ from one another, and further comprising the step of deriving multiple third capture parameters, one each for each of such multiple regions, and wherein each such third capture parameter is applied to the imaging assembly in correspondence to each of such multiple regions.

12. The method according to claim 9, wherein one of the first and second capture parameters causes a blue-shift in spectral sensitivity relative to the other of the first and second capture parameters.

13. The method according to claim 9, wherein the imaging assembly provides two or more color channels of information for each pixel of the scene, and wherein in said determining step, the illuminant is determined based on ratios of the two or more color channels.

14. The method according to claim 13, wherein determining an illuminant for the scene includes referencing a look-up table based on the ratios of the channels, wherein the look-up table includes entries that associate two or more ratios of the color channels with illuminants.

15. The method according to claim 14, wherein the color channels include a red-like channel, a blue-like channel, and a green-like channel, and wherein the ratios include a red-like channel to green-like channel ratio and a red-like channel to blue-like channel ratio.

16. The method according to claim 9, wherein the illuminant is tungsten, halogen, fluorescent, sodium vapor, or a daylight illuminant.

17. An apparatus comprising:
   an imaging assembly having a spectral response which is tunable in accordance with a capture parameter;
   a control unit constructed to apply a first capture parameter and a second capture parameter to the imaging assembly, and to capture respective ones of a first image of the scene and a second image of the scene using the imaging assembly whose spectral response is tuned in accordance with the first and second capture parameters, wherein the second capture parameter is different from the first capture parameter; and
   a scene property analysis module constructed to determine an illuminant for the scene based on at least one color channel ratio of the first image of the scene and at least one color channel ratio of the second image of the scene, wherein the illuminant has a defined spectral power distribution.

18. The apparatus according to claim 17, wherein the first and second images are compared to identify multiple regions of the scene having a similar illuminant.

19. The apparatus according to claim 17, wherein the first and second images are compared to identify multiple regions in the scene having illuminants that differ from one another.

20. The apparatus according to claim 17, wherein the first and second capture parameters are sufficiently different from each other so as to provide good discrimination for the illuminant.

21. The apparatus according to claim 17, wherein one of the first and second capture parameters causes a blue-shift in spectral sensitivity relative to the other of the first and second capture parameters.

22. The apparatus according to claim 17, wherein the imaging assembly provides three or more channels of information for each pixel of the scene, including a red-like channel, a blue-like channel and a green-like channel.

23. The apparatus according to claim 17, wherein the imaging assembly comprises an image sensor which has a tunable spectral response.

24. The apparatus according to claim 17, wherein the imaging assembly comprises an image sensor and a preceding color filter array which has a tunable spectral response.

25. An apparatus comprising:
   an imaging assembly having a spectral response which is tunable in accordance with a capture parameter;
   a control unit constructed to apply a first capture parameter and a second capture parameter to the imaging assembly, and to capture respective ones of a first image of the scene and a second image of the scene using the imaging assembly whose spectral response is tuned in accordance with the first and second capture parameters, wherein the second capture parameter is different from the first capture parameter;
   a scene property analysis module constructed to determine an illuminant for the scene based on at least one color channel ratio of the first image of the scene and at least one color channel ratio of the second image of the scene, wherein the illuminant has a defined spectral power distribution; and
   a mask generation unit constructed to derive a third capture parameter in accordance with the illuminant identified for the scene, wherein the third capture parameter is derived so as to obtain white balance in accordance with the identified illuminant;

wherein the control unit is further constructed to apply the third capture parameter to the imaging assembly.

26. The apparatus according to claim 25, wherein the at least one color channel ratio of the first image and the at least one color channel ratio of the second image are compared to identify multiple regions of the scene having a similar illuminant, and wherein the third capture parameter is applied to the imaging assembly for all of such multiple regions.

27. The apparatus according to claim 25, wherein the at least one color channel ratio of the first image and the at least one color channel ratio of the second image are compared to identify multiple regions in the scene having illuminants that differ from one another, wherein the mask generation unit derives multiple third capture parameters, one each for each of such multiple regions, and wherein each such third capture parameter is applied to the imaging assembly in correspondence to each of such multiple regions.

28. The apparatus according to claim 25, wherein the first and second capture parameters are sufficiently different from each other so as to provide good discrimination for the illuminant.

29. The apparatus according to claim 25, wherein one of the first and second capture parameters causes a blue-shift in spectral sensitivity relative to the other of the first and second capture parameters.

30. The apparatus according to claim 25, wherein the imaging assembly provides three or more channels of information for each pixel of the scene, including a red-like channel, a blue-like channel and a green-like channel.

31. The apparatus according to claim 25, wherein the imaging assembly comprises an image sensor which has a tunable spectral response.

32. The apparatus according to claim 25, wherein the imaging assembly comprises an image sensor and a preceding color filter array which has a tunable spectral response.

33. A non-transitory computer-readable medium having computer-executable process steps stored thereon for identifying an imaging property for a scene by using an imaging assembly which has a spectral response which is tunable in accordance with a capture parameter, wherein said process steps comprise:
a first applying step to apply a first capture parameter to the imaging assembly, and capturing a first image of the scene using the imaging assembly whose spectral response is tuned in accordance with the first capture parameter;
a second applying step to apply a second capture parameter to the imaging assembly, wherein the second capture parameter is different from the first capture parameter, and capturing a second image of the scene using the imaging assembly whose spectral response is tuned in accordance with the second capture parameter; and an identifying step to identify an illuminant for the scene based on at least one color channel ratio of the first image of the scene and at least one color channel ratio of the second image of the scene, wherein the illuminant has a defined spectral power distribution.

34. The non-transitory computer-readable medium according to claim 33, wherein said process steps further comprise a comparing step, wherein the first and second images are compared to identify multiple regions of the scene having a similar illuminant.

35. The non-transitory computer-readable medium according to claim 33, wherein said process steps further comprise a comparing step, wherein the first and second images are compared to identify multiple regions in the scene having illuminants that differ from one another.

36. The non-transitory computer-readable medium according to claim 33, wherein the first and second capture parameters are sufficiently different from each other so as to provide good discrimination for the illuminant.

37. The non-transitory computer-readable medium according to claim 33, wherein one of the first and second capture parameters causes a blue-shift in spectral sensitivity relative to the other of the first and second capture parameters.

38. The non-transitory computer-readable medium according to claim 33, wherein the imaging assembly provides three or more channels of information for each pixel of the scene, including a red-like channel, a blue-like channel and a identified based at least on a red/green ratio and a red/blue ratio of the first image and a red/green ratio and a red/blue ratio of the second image.

39. The non-transitory computer-readable medium according to claim 33, wherein the imaging assembly comprises an image sensor which has a tunable spectral response.

40. The non-transitory computer-readable medium according to claim 33, wherein the imaging assembly comprises an image sensor and a preceding color filter array which has a tunable spectral response.

41. A non-transitory computer-readable medium having computer-executable process steps stored thereon for adjusting white balance of an image capture device which includes an imaging assembly having a spectral response which is tunable in accordance with a capture parameter, wherein said process steps comprise:
a first applying step to apply a first capture parameter to the imaging assembly, and capturing a first image of the scene using the imaging assembly whose spectral response is tuned in accordance with the first capture parameter;
a second applying step to apply a second capture parameter to the imaging assembly, wherein the second capture parameter is different from the first capture parameter, and capturing a second image of the scene by using the imaging assembly whose spectral response is tuned in accordance with the second capture parameter; an identifying step to identify an illuminant based on one or more color channel ratios of the first image of the scene and one or more color channel ratio of the second image of the scene; a deriving step to derive a third capture parameter in accordance with the identified illuminant for the scene, wherein the third capture parameter is derived so as to obtain white balance in accordance with the identified illuminant; and
a third applying step to apply the third capture parameter to the imaging assembly.

42. The non-transitory computer-readable medium according to claim 41, wherein said process steps further comprise a comparing step, wherein the first and second images are compared to identify multiple regions of the scene having a similar illuminant, and wherein the third capture parameter is applied to the imaging assembly for all of such multiple regions.

43. The non-transitory computer-readable medium according to claim 41, wherein said process steps further comprise a comparing step, wherein the first and second images are compared to identify multiple regions in the scene having illuminants that differ from one another, and further comprise the step of deriving multiple third capture parameters, one each for each of such multiple regions, and wherein each such third capture parameter is applied to the imaging assembly in correspondence to each of such multiple regions.

44. The non-transitory computer-readable medium according to claim 41, wherein the first and second capture parameters are sufficiently different from each other so as to provide good discrimination for the illuminant.

45. The non-transitory computer-readable medium according to claim 41, wherein one of the first and second capture parameters causes a blue-shift in spectral sensitivity relative to the other of the first and second capture parameters.

46. The non-transitory computer-readable medium according to claim 41, wherein the imaging assembly provides three or more channels of information for each pixel of the scene, including a red-like channel, a blue-like channel and a green-like channel, and wherein in said identifying step, the illuminant is identified based at least on a red/green ratio and a red/blue ratio of the first image and a red/green ratio and a red/blue ratio of the second image.

47. The non-transitory computer-readable medium according to claim 41, wherein the imaging assembly comprises an image sensor which has a tunable spectral response.

48. The non-transitory computer-readable medium according to claim 41, wherein the imaging assembly comprises an image sensor and a preceding color filter array which has a tunable spectral response.

49. An apparatus comprising:
an imaging assembly having a spectral response which is tunable in accordance with a capture parameter;
a memory for storing computer-executable process steps; and
a processor for executing the computer-executable process steps stored in the memory,
wherein the computer-executable process steps comprise
code for executing a first applying step to apply a first capture parameter to the imaging assembly, and capturing a first image of the scene using the imaging assembly whose spectral response is tuned in accordance with the first capture parameter;
code for executing a second applying step to apply a second capture parameter to the imaging assembly, wherein the second capture parameter is different from the first capture parameter, and capturing a second image of the scene using the imaging assembly whose spectral response is tuned in accordance with the second capture parameter; and
code for executing an identifying step to identify an illuminant for the scene based on at least one color channel ratio of the first image of the scene and at least one color channel ratio of the second image of the scene, wherein the illuminant has a defined spectral power distribution.

50. The apparatus according to claim 49, wherein said process steps further comprise a comparing step, wherein the first and second images are compared to identify multiple regions of the scene having a similar illuminant.

51. The apparatus according to claim 49, wherein said process steps further comprise a comparing step, wherein the first and second images are compared to identify multiple regions in the scene having illuminants that differ from one another.

52. The apparatus according to claim 49, wherein the first and second capture parameters are sufficiently different from each other so as to provide good discrimination for the illuminant.

53. The apparatus according to claim 49, wherein one of the first and second capture parameters causes a blue-shift in spectral sensitivity relative to the other of the first and second capture parameters.

54. The apparatus according to claim 49, wherein the imaging assembly provides three or more channels of information for each pixel of the scene, including a red-like channel, a blue-like channel and a green-like channel, and wherein in said identifying step, the illuminant is identified based at least on a red/green ratio and a red/blue ratio of the first image and a red/green ratio and a red/blue ratio of the second image.

55. The apparatus according to claim 49, wherein the imaging assembly comprises an image sensor which has a tunable spectral response.

56. The apparatus according to claim 49, wherein the imaging assembly comprises an image sensor and a preceding color filter array which has a tunable spectral response.

57. An apparatus comprising:
an imaging assembly having a spectral response which is tunable in accordance with a capture parameter;
a memory for storing computer-executable process steps; and
a processor for executing the computer-executable process steps stored in the memory;
wherein the computer-executable process steps comprise:
code for executing a first applying step to apply a first capture parameter to the imaging assembly, and capturing a first image of the scene using the imaging assembly whose spectral response is tuned in accordance with the first capture parameter;
code for executing a second applying step to apply a second capture parameter to the imaging assembly, wherein the second capture parameter is different from the first capture parameter, and capturing a second image of the scene by using the imaging assembly whose spectral response is tuned in accordance with the second capture parameter;
code for executing an identifying step to identify an illuminant based on one or more color channel ratios of the first image of the scene and one or more color channel ratios of the second image of the scene;
code for executing a deriving step to derive a third capture parameter in accordance with the identified illuminant for the scene, wherein the third capture parameter is derived so as to obtain white balance in accordance with the identified illuminant; and
code for executing a third applying step to apply the third capture parameter to the imaging assembly.

58. The apparatus according to claim 57, wherein said process steps further comprise a comparing step, wherein the first and second images are compared to identify multiple regions of the scene having a similar illuminant, and wherein the third capture parameter is applied to the imaging assembly for all of such multiple regions.

59. The apparatus according to claim 57, wherein said process steps further comprise a comparing step, wherein the first and second images are compared to identify multiple regions in the scene having illuminants that differ from one another, and further comprise the step of deriving multiple third capture parameters, one each for each of such multiple regions, and wherein each such third capture parameter is applied to the imaging assembly in correspondence to each of such multiple regions.

60. The apparatus according to claim 57, wherein the first and second capture parameters are sufficiently different from each other so as to provide good discrimination for the illuminant.

61. The apparatus according to claim 57, wherein one of the first and second capture parameters causes a blue-shift in spectral sensitivity relative to the other of the first and second capture parameters.

62. The apparatus according to claim 57, wherein the imaging assembly provides three or more channels of information for each pixel of the scene, including a red-like channel, a blue-like channel and a green-like channel, and wherein in said identifying step, the illuminant is identified based at least on a red/green ratio and a red/blue ratio of the first image and a red/green ratio and a red/blue ratio of the second image.

63. The apparatus according to claim 57, wherein the imaging assembly comprises an image sensor which has a tunable spectral response.

64. The apparatus according to claim 57, wherein the imaging assembly comprises an image sensor and a preceding color filter array which has a tunable spectral response.

* * * * *